(12) United States Patent
Goldman et al.

(10) Patent No.: US 7,018,210 B2
(45) Date of Patent: *Mar. 28, 2006

(54) METHOD AND APPARATUS FOR TEACHING AND LEARNING READING

(75) Inventors: Dennis K. Goldman, Lincolnshire, IL (US); Mary Watanabe, Libertyville, IL (US); Richard Woldenberg, Highland Park, IL (US)

(73) Assignee: ETA/Cuisenaire, Vernon HIlls, IL (US)

( * ) Notice: Subject to any disclaimer, the term of this patent is extended or adjusted under 35 U.S.C. 154(b) by 28 days.

This patent is subject to a terminal disclaimer.

(21) Appl. No.: 10/724,965

(22) Filed: Dec. 1, 2003

(65) Prior Publication Data

US 2004/0197749 A1 Oct. 7, 2004

Related U.S. Application Data

(63) Continuation-in-part of application No. 09/675,073, filed on Sep. 28, 2000, now Pat. No. 6,685,477.

(51) Int. Cl.
*G09B 1/16* (2006.01)
*G09B 1/34* (2006.01)
*G09B 1/40* (2006.01)

(52) U.S. Cl. .................... 434/172; 434/178; 434/403
(58) Field of Classification Search ................ 434/172, 434/171, 178, 403, 170; 273/156, 157 R
See application file for complete search history.

(56) References Cited

U.S. PATENT DOCUMENTS

| 1,542,031 | A | * | 6/1925 | Bruhn | 434/172 |
|---|---|---|---|---|---|
| 2,386,114 | A | | 10/1945 | Hayes | |
| 2,987,833 | A | * | 6/1961 | Stolpen | 434/172 |
| 3,469,325 | A | | 9/1969 | Greenberg | |
| 3,478,446 | A | | 11/1969 | McCutcheon | |
| 3,636,230 | A | | 1/1972 | Tacey | |
| 3,728,800 | A | * | 4/1973 | Magram | 434/171 |
| 3,903,617 | A | * | 9/1975 | Evans | 434/171 |

(Continued)

FOREIGN PATENT DOCUMENTS

DE 3323588 C1 8/1984

(Continued)

OTHER PUBLICATIONS

Complaint filed May 10, 2004 in Civil Action No. 04-10926 MLW, captioned, Didax, Incorporated vs. ETA/Cuisenaire, a division of A. Daigger & Company, Incorporated, in the United States District Court, District of Massachusetts.

(Continued)

*Primary Examiner*—Bena Miller
(74) *Attorney, Agent, or Firm*—Michael Best & Friedrich LLP

(57) ABSTRACT

A method and apparatus for teaching and learning reading is disclosed. The apparatus is a group of universally connectable blocks and a primer having intelligible reading units composed of reading indicia. Each block has at least three faces, and each face of a given block the same reading indicia type. Each block has a color that corresponds to the reading indicia type. The primer's reading indicia are colored to correspond to the blocks bearing the same reading indicia type. The method comprises reading the primer, reading selected reading indicia in the primer, and locating blocks having the selected reading indicia. An intelligible reading unit comprised of the selected reading indicia in the primer is read and assembled from the blocks. Two blocks are selected, having the identified reading indicia, and connected. The color or selected indicia are viewed to determine whether the indicia form the selected intelligible reading unit.

24 Claims, 11 Drawing Sheets

U.S. PATENT DOCUMENTS

| | | | |
|---|---|---|---|
| 4,014,548 A | | 3/1977 | Trilling |
| 4,044,476 A | * | 8/1977 | Marsh .......................... 434/171 |
| 4,637,799 A | * | 1/1987 | Bouchal ..................... 434/236 |
| 4,778,392 A | * | 10/1988 | Mitchell ..................... 434/403 |
| 4,914,019 A | * | 4/1990 | Chu ........................... 434/171 |
| 5,238,407 A | * | 8/1993 | Pollock ....................... 434/195 |
| 5,447,433 A | | 9/1995 | Perry |
| 5,554,062 A | * | 9/1996 | Goldsen ..................... 446/124 |
| 5,567,159 A | * | 10/1996 | Tehan ......................... 434/178 |
| 5,795,163 A | | 8/1998 | Alioto |
| 5,833,465 A | | 11/1998 | Jarzewiak |
| 6,685,477 B1 | | 2/2004 | Goldman et al. |

FOREIGN PATENT DOCUMENTS

| | | |
|---|---|---|
| FR | 2356220 A | 2/1978 |
| GB | 744850 | 2/1956 |
| GB | 2255915 A | 11/1992 |

OTHER PUBLICATIONS

Photocopy of cover of Educational Insights School Catalog 2000 and page showing Phonics Tiles and Trays Set and Lots O'Tiles Set.

Photocopy of Hasbro & Parker Brothers "Boggle" game.

Larson-Rutter, Emily and Lapp, Shelley, "Unifix Phonics Activities (Grades 1-2)", World Teachers Press © 2000 Didax Educational Resources (ISBN 1-58324-043-8), entire workbook.

Pictures of Lakeshore and LDA products: LA-226, Hands-on Sentence Building Cubes; LA-363, Phonics Magnetic Kit; RR-285, Build-A-Word Cubes; LC-1639, Magnetic Story Board; LL01114, Three, Four, Five.

ETA K-6 Reading Language Arts 2000 catalog, pp. 1-6, 12-16, 22-26, 34, 41.

Pictures of Products: Celebration Alphasnaps, No. 1-574-52254-X and Alphasnaps and Snap Cube Sets, No. 1-574-52253-1; Chunks-The Incredible Word Building Game.

* cited by examiner

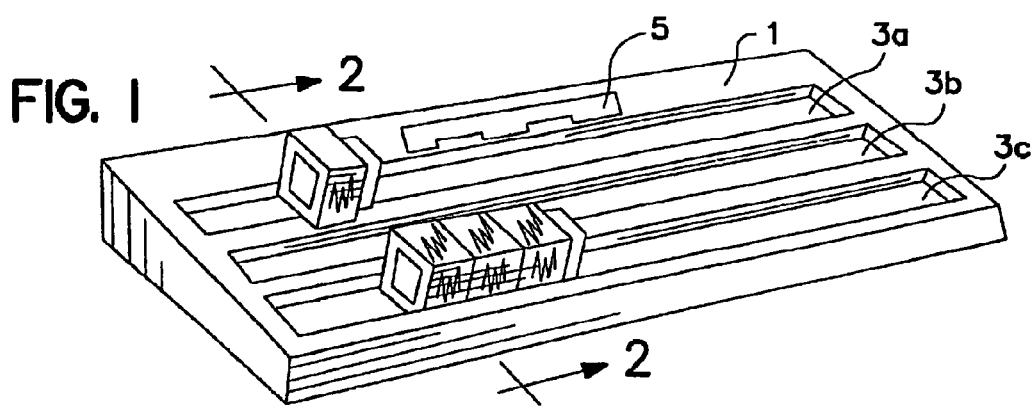
FIG. 1
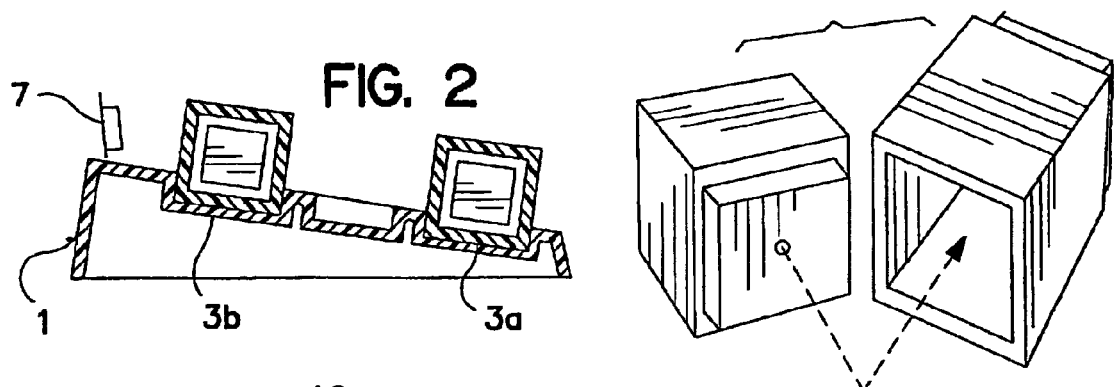
FIG. 2
FIG. 3
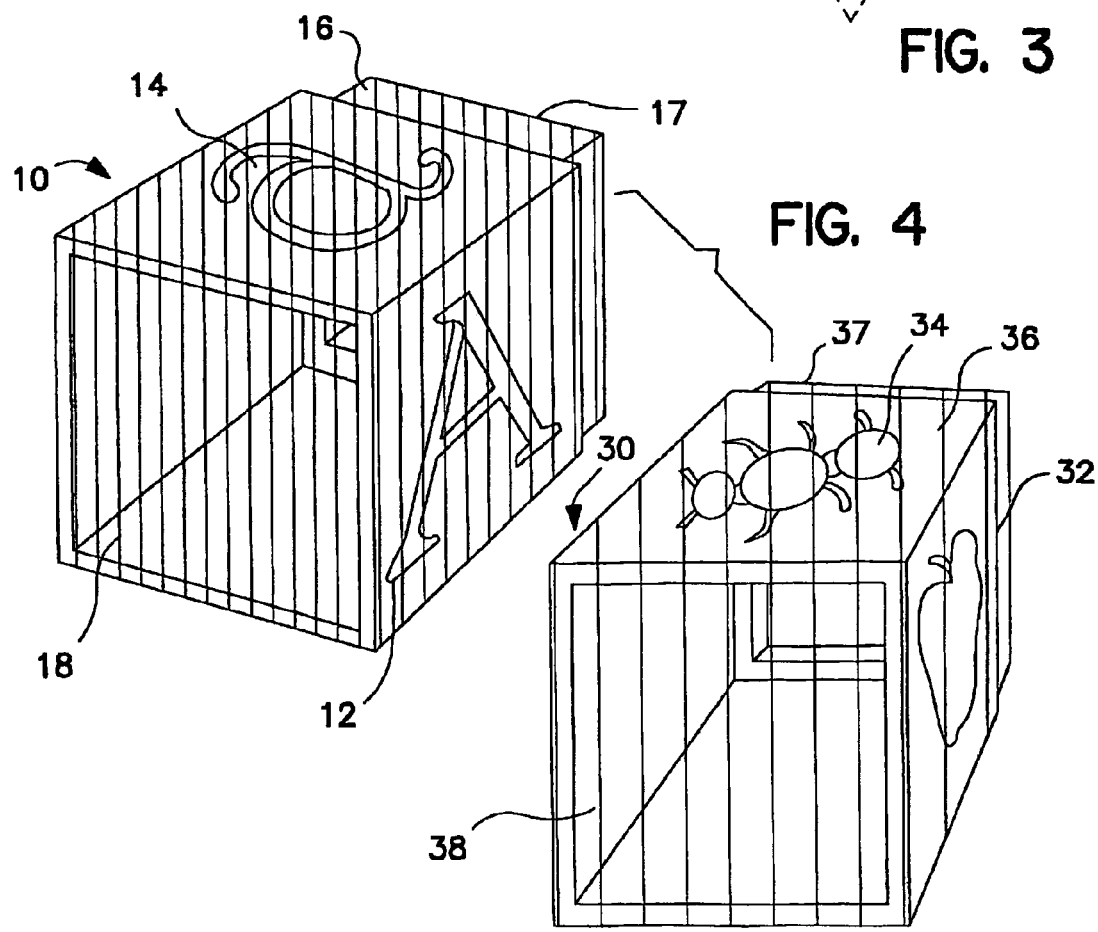
FIG. 4

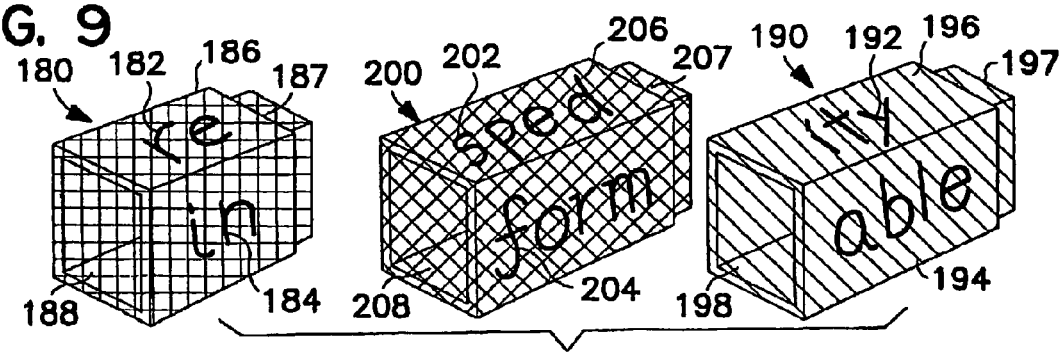
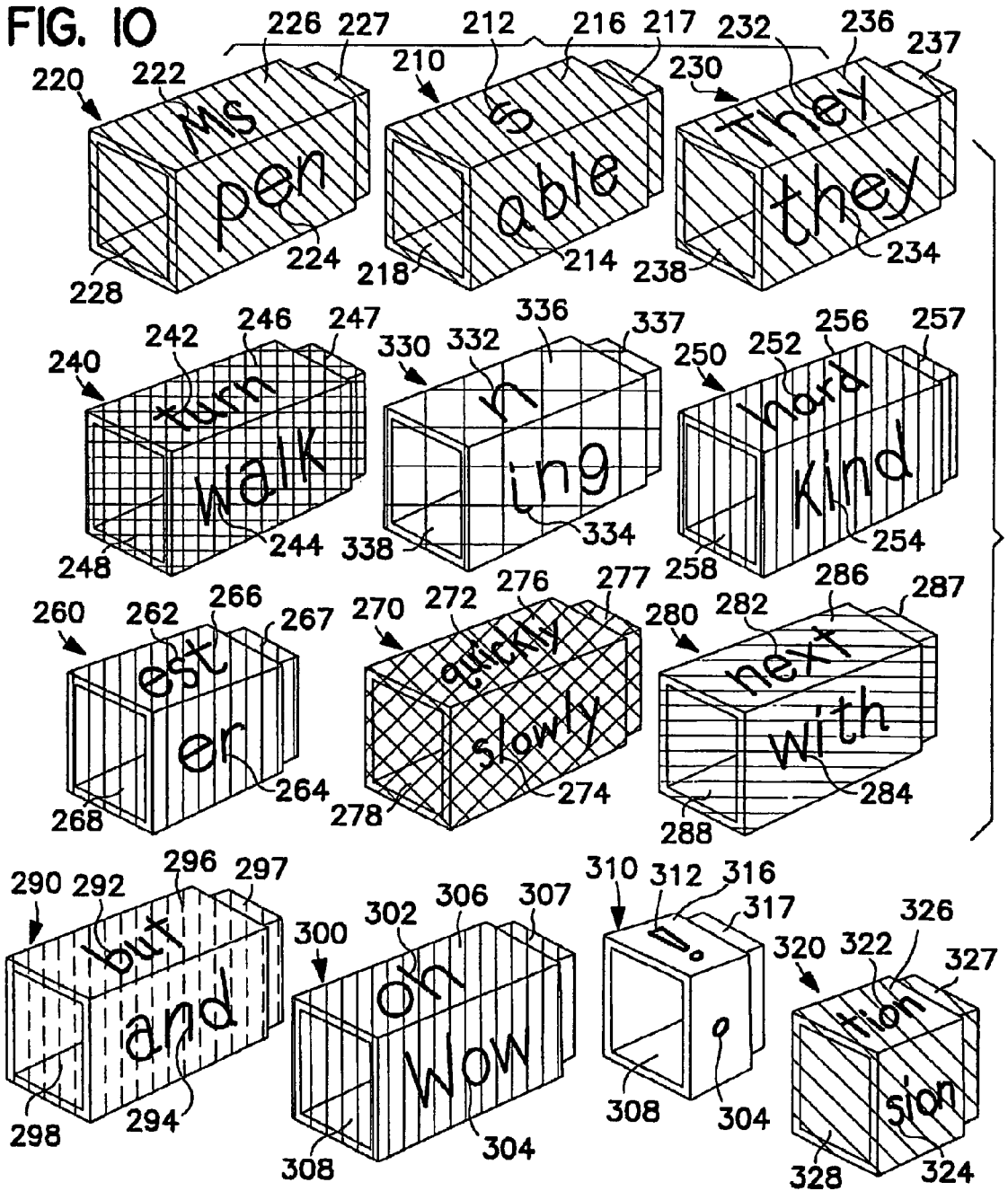

METHOD AND APPARATUS FOR TEACHING AND LEARNING READING

CROSS-REFERENCE TO RELATED APPLICATIONS

This application is a continuation-in-part of U.S. patent application Ser. No. 09/675,073, filed Sep. 28, 2000, now U.S. Pat. No. 6,685,477.

This invention relates to methods for teaching pre-emergent and emergent readers, and, in particular, an apparatus for accomplishing these tasks.

BACKGROUND OF THE INVENTION

There are various known devices for teaching pre-emergent and emergent readers alphabet and phoneme awareness, recognition of spelling patterns and initial consonant sounds, word building, and sentence construction. However, as students progress in skill level, these devices do not provide a consistent or progressively challenging approach throughout the process of teaching reading and spelling, nor are they suitable for teaching such readers via several different methods. Different people learn in different ways, e.g., seeing, doing, touching (manipulating).

Known devices include kits of substantially two-dimensional pieces which offer different colors and different sizes of parts that fit together and bear letters, word parts or words to reinforce reading and spelling skills, but they do not offer the opportunity to simultaneously mix and match different, but similar, information. That is, because the pieces are flat each such piece provides only one visible piece of reading information. For example, alphabet pieces will have only one letter of the alphabet visible. There are also kits of three-dimensional pieces shaped like blocks and bearing letters, word parts or words to reinforce reading and spelling skills, which may be placed next to each other, but which do not connect together. Without connection, the blocks are easily disturbed by beginning readers who lack good small motor skills. Thus, the known three-dimensional pieces lack tactile connections. Also known are three-dimensional, snap-fit blocks used to teach math skills. These blocks, however, do not teach reading skills and carry only one kind of math indicia on any given block.

Consequently, a need exists for, and it is an object of this invention to provide, a method for teaching reading, spelling, and grammar/usage using an apparatus which can be used to facilitate different learning methods, progressively challenge students as they improve their skills, and permit interlocking of letters, word parts or words to teach reading, spelling, and grammar/usage.

In addition, this method and apparatus can be used in connection with one or more primers in teaching and reinforcing reading skills.

SUMMARY OF THE INVENTION

The present invention is comprised of kits including a variety of three-dimensional, connectable color-coded blocks. Each kit can be used for a different step or level in learning to read, from the initial steps of learning the difference between vowels and consonants and matching letter sounds to pictures, to building at first shorter and then longer words, to finally constructing sentences. The users can choose the order of teaching to fit their basal program. The blocks include "reading indicia" or units of reading information on multiple sides, e.g., pictures, letters, phonemes, word parts, or words. In a preferred embodiment, the various information is pre-applied to the blocks so that the information is readable with the male portion of the snap oriented to the user's right. This facilitates the left-to-right reading practice of the English language. Additional information is provided to the user by varying the color of the blocks according to the type of information displayed (e.g., vowel and consonant blocks are different colors in one of the kits). The length of the blocks also varies according to the information conveyed. For example, blocks with a single letter are smaller in length than blocks with multiple letters. The blocks all have the same cross-sectional size, so that when two or more blocks are connected, their indicia-bearing faces are co-planar. Blank blocks are also included for use as "unknown" letters in sequencing activities, as letters or words that the user would like to add to the set, and as replacement blocks that can be written on with either a permanent or dry-erase marker.

Each block has systematic, developmentally appropriate information. To encourage recognition of an alliterative pattern, for example, certain blocks have different, but related, indicia or information on each side. For instance, a block could have both uppercase and lowercase forms of the same letter. By combining two or more blocks so that selected indicia appear on adjoining faces, an "intelligible reading unit", such as a word or sentence, is formed.

An intelligible reading unit results from the combination of two or more reading indicia to form a unit capable of being understood. Reading indicia include vowels, consonants, pictures, initial consonants, rimes, "magic" e's, consonant combinations, vowel combinations, affixes, root words, nouns, noun endings, pronouns, verbs, verb endings, adjectives, adjective endings, adverbs, prepositions, conjunctions, interjections, and punctuation marks.

Each kit is designed to develop specific types of reading or phonics skills and thus each kit provides different types of information. However, all the kits have certain elements in common. The blocks satisfy the needs of visual, aural, and tactile (kinesthetic) learning styles. For instance, the blocks are designed to be removably fixed together, so that inadvertent manipulation will not change the teacher or student-selected order of the blocks. Preferably, the block connection occurs in a single direction or orientation, thus reinforcing the directionality of reading that is necessary to eventually develop good reading skills. Also, each kit is used to build an intelligible reading unit including reading indicia from at least two different blocks (sub-parts), each of which is found on color-coded blocks. For instance, one kit can be used to assemble a picture/letter unit including a block with pictures and a block carrying the first or last letter of the word naming that picture. Because the picture blocks and the letter blocks are different colors, the user can be taught to associate the different colors with different types of information (i.e., red means vowels, blue means consonants), and eventually to recognize a particular type of information (e.g., vowels) without the triggering color association. Thus, the color of a block in any kit will suggest the type of reading indicia carried on its sides. Additionally, with color-coded blocks, the teacher can confirm from a distance that a particular student's assembly at least appears to be correct. In one embodiment, the blocks are predrilled so they may be threaded as if they were beads on a string.

In another form, the invention also includes a method of teaching and learning reading using a group of such universally connectable, three-dimensional, color-coded blocks in connection with a primer having intelligible reading units composed of reading indicia. Each block in the group has at least three faces, with each face bearing a type of reading indicia. The type of reading indicia is the same on all faces of a given block. Each block has a color, with the color assigned particularly to the type of reading indicia on the faces. At least one of the reading indicia in the primer is colored to correspond to the color of the blocks bearing the same type of reading indicia. The method involves: reading the primer; selecting an intelligible reading unit from the primer; identifying the reading indicia comprising the selected intelligible reading unit; selecting a first and a second block from the group of universally connectable blocks having the identified reading indicia; connecting the first block and second blocks so that the connected blocks are horizontally adjacent and the selected indicia-bearing faces of each block are visible from the same direction; and viewing the color or selected indicia of said connected blocks to determine whether said indicia appear together to form the selected intelligible reading unit.

Although the invention is described in terms of the alphabet and English words, the invention could just as easily be adapted to teach reading with other alphabets and other languages.

BRIEF DESCRIPTION OF THE DRAWINGS

FIG. 1 is a perspective view of blocks and a slot for removably receiving an activity flipbook (not seen) in a tray of the invention.

FIG. 2 is a cross-sectional view of the blocks, book and tray of FIG. 1.

FIG. 3 shows the assembly of the blocks of the invention.

FIGS. 4 and 5 are perspective views of four blocks from the alphabet and phonemic awareness kit of the invention.

FIG. 9 is a perspective view of three blocks from the prefixes-suffixes-root word building kit of the invention.

FIG. 10 is a perspective view of thirteen blocks from the sentence construction kit of the invention.

DETAILED DESCRIPTION OF THE INVENTION

The present invention involves a method of teaching reading using a series of kits of blocks, each containing reading indicia or units of reading information. Each kit teaches one or more reading skills. Although the kits each have some teaching value, that value is maximized by using all of the kits at the appropriate stages of a student's progress in learning to read. Additional value resides in combining the kits of blocks with primers as described hereinafter.

As seen in FIGS. 1 and 2, the blocks may be placed on a tray 1 having guides or channels 3 for receivably holding the blocks. The channel is large enough to hold two or more blocks so that they are side-by-side. The channel walls 3*a*, 3*b*, and 3*c* prevent the blocks from being inadvertently moved from the tray by the user. The tray 1 also has a slot 5 for receivably holding a flipbook 7. The tray controls random movement of the blocks by providing these channels to hold the blocks in place. The tray also encourages focus on particular letters and blocks by screening out the sides not being used on each block. The channels of the tray combined with the cubes themselves also promote the left-to-right directionality of reading the English language (and other similar languages) because the reading indicia would be upside down, as well as backwards, if the cubes were placed on the tray in a right-to-left direction. This tray is an important improvement over the prior art tiles. With the prior art tiles, teachers complain that words are unintentionally formed and scrambled because their letter tiles do not stay in place. Of course, for languages in which reading indicia are read right-to-left, such as Hebrew, the tray and cubes would be designed so as to promote the right-to-left directionality of reading. Likewise, for languages such as Chinese and Japanese, the channels of the tray and the cubes' reading indicia would be designed to promote the vertical directionality of reading.

The flipbook 7 can provide activities to reinforce many of the methods used herein to teach reading, spelling, and grammar/usage. The flipbook preferably has color-coded icons keyed to the blocks of the apparatus, allowing students to use the flipbooks for independent practice. Each of the blocks are removably connectable to each other ("universally connectable"). The means for removably connecting the blocks may be by frictionally engaging a male end of one block to a female end of another block, by hook-and-loop, by reusable adhesive, by mechanically interlocking a knob and slot, or by other similar means.

Alphabet and Phonemic Awareness Kit

Figure 5:
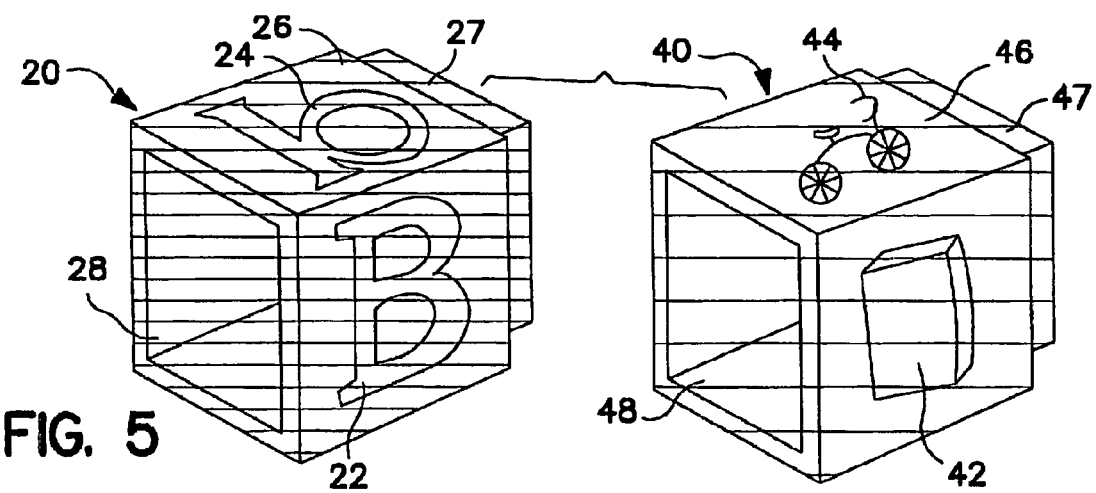

As shown in FIGS. 4 and 5, the alphabet and phonemic awareness kit has two types of blocks, alphabet blocks 10, 20 and picture blocks 30, 40. Each of the alphabet blocks feature uppercase and lowercase versions of a particular letter, either consonants or vowels. Thus, block 10 shows an uppercase "A" 12 and a lowercase "a" 14. Block 20 shows an uppercase "B" 22 and a lowercase "b" 24. The consonant blocks are one color 16 (such as blue), while the vowel blocks are a different color 26 (such as red).

Each of the picture blocks in this kit generally has four different pictures on the sides. The pictures are selected so that the descriptive word for each picture starts with the same letter. Thus, picture block 30 shows an apple 32 and an ant 34. Picture block 40 shows a book 42 and a bicycle 44. An exception to this rule may be made for certain letters. For instance, the picture blocks for Y and Z each have only two pictures. Likewise, the picture blocks bearing pictures described by words beginning with short vowel sounds ("vowel picture blocks") each have three pictures, with the fourth side left blank for use by teachers who want to teach long vowel sounds by suggesting pictures such as "ape" for "long a".

The picture blocks bearing pictures described by words starting with consonants ("consonant picture blocks") have a color 36 which is similar but not identical to the color of consonant blocks. The vowel picture blocks have a color 46 which is similar but not identical to the color of the vowel blocks. Thus, if the vowel blocks are red, the vowel picture blocks are desirably pink. Likewise, if the consonant blocks are dark blue, the consonant picture blocks are desirably light blue.

The consonant blocks are selected from the uppercase and lowercase consonants B, C, D, F, G, H, J, K, L, M, N, P, Q, R, S, T, V, W, X, Y, Z. The vowel blocks are selected from the uppercase and lowercase vowels A, E, I, O, U and optionally Y. An example of the pictures found on a consonant picture block for the letter B are icons or pictures of a ball, banana, bicycle, and book. Likewise, the vowel picture block for the letter A has icons for ant, apple, and ax.

The blocks, as is true for all blocks of the present invention, are designed to be removably fixed together. Thus, each block has a male part and a female part. As can be seen in FIG. 4, vowel block 10 has a male part 17 and a female part 18; vowel picture block 30 has a male part 37 and a female part 38. When the blocks are oriented so that all the letters or pictures are oriented in the same direction (i.e., so they are readable and recognizable), the male part is always on the same end (e.g., on the right) and the female part is always on the opposite (or left) end. Thus, the male part 17 of the vowel block 10 will snap fit into the female end 37 of the vowel picture block 30, removably fixing the blocks together.

The blocks each have a plurality of faces, with each face oriented perpendicularly to two other faces. Each face is sufficiently large enough to bear a reading indicium that is easily recognizable. When two or more blocks are connected together, the upper faces on the blocks are co-planar.

An example of the illustrations found on a complete set of picture blocks for each of the letters of the English alphabet follows.

| Letters | Picture blocks | | | |
| --- | --- | --- | --- | --- |
| | Side 1 | Side 2 | Side 3 | Side 4 |
| A | ant | apple | ax | |
| B | ball | banana | bicycle | book |
| C | camel | cat | cow | cup |
| D | dice | dog | doll | duck |
| E | elephant | elbow | envelope | |
| F | feet | fish | fox | frog |
| G | grapes | girl | goat | gorilla |
| H | hand | hat | horse | house |
| I | igloo | inchworm | Indian chief | |
| J | jar | jeep | jet | jump rope |
| K | kangaroo | key | king | kite |
| L | lamp | leaf | light bulb | lion |
| M | milk | monkey | moon | mouse |
| N | necklace | nest | needle | nose |
| O | octopus | ostrich | ox | |
| P | paperclip | pig | pumpkin | pencil |
| Q | queen | question mark | quarter | quilt |
| R | rabbit | ring | rose | rowboat |
| S | saw | seal | sock | sun |
| T | table | television | tiger | turtle |
| U | umbrella | up | under | |
| V | valentine | van | violin | vacuum |
| W | wagon | watch | well | wig |
| X | exit sign | xylophone | x-ray | xylophone |
| Y | yarn | yo-yo | yarn | yo-yo |
| Z | zebra | zipper | zoo | zero |

Examples of Use of the Alphabet and Phonemic Awareness Kit

The inventive alphabet and phonemic awareness kit provides students with motivating, hands-on experiences as they explore the alphabetic code system of the English language. Students who may be reluctant to do pencil and paper exercises especially may be encouraged to think about letters and sounds with these tactile, colorful blocks through a hands-on experience.

The alphabet and phonemic awareness kit is particularly effective to instruct students in phonemic awareness, that is, to distinguish the sounds that make up spoken language. Research has shown that developing this ability is considered a crucial step toward helping students unlock the code of written text and is a predictor of later reading success. The alphabet and phonemic awareness kit can be used in activities to help students examine the sounds of words in a logical progression, including: analyzing and synthesizing syllables; isolating phonemes at the beginning, middle, and end of words; blending phonemes; segmenting phonemes; and manipulating phonemes within a word. Students can then progress to using the alphabet blocks for letter identification, alphabetical order, and matching sounds to symbols.

EXAMPLE 1

Isolating Initial Sounds

This exercise is used to teach a student to isolate the first sound from a word beginning with an initial consonant, using the consonant picture blocks in finger play and other activities.

First, a consonant picture block is selected and given to the student. Then, the student is instructed to place the selected block on his or her left index finger, much like a finger puppet. The student and teacher rotate the block and say the names of the pictures on the block together. The student and teacher then discuss the identicalness of the initial sound for each picture. To reinforce the initial sound, the names of the pictures are repeated, with emphasis placed on the phoneme. For instance, for the B picture block, the teacher and student would pronounce the letter "B" and then pronounce the words describing the pictures beginning with b.

Once the teacher is satisfied with the recitation, the teacher may instruct the student to remove the first consonant block and place a second consonant picture block on the left index finger. This step is preferably repeated for five consonants. When familiarity with the selected five consonants is sufficient, the teacher may then have the student place all five consonant picture blocks on the fingers of the left hand, and sing a reinforcing song, with the B picture block verse.

With each mention of a different picture, the student would turn the relevant consonant picture block so as to see the mentioned picture. Reinforcing songs would follow for each of the five blocks.

The teacher can provide additional reinforcement of the phoneme by telling little stories in which one word is not completed, and only the initial phoneme is pronounced. The student can then look at his or her collection of picture blocks, identify the block featuring the selected phoneme, and choose the picture from that block which best fits the context of the story. For instance, if the teacher says "That clown is wearing a curly /w/_," the student would sort through the picture blocks until identifying the picture block having pictures starting with "w." (When a letter is pronounced and not named, it appears between slash marks.) The student would then sort through the pictures (for instance, wagon, watch, well, and wig) and choose "wig" as best fitting the context of the story.

A student can be taught to associate the same initial consonant with objects not pictured on the block, including grocery items, pictures from old magazines and catalogues, and the names of persons.

A student can learn to sort the blocks on the basis of the initial consonant. For instance, the student could be provided with a set of blocks, in which the initial consonants are a subset of all consonants and there are one or more blocks having a selected initial consonant. Preferably, the student receives a set of about 20 consonant picture blocks having 4 to 6 phonemes represented. The student is then guided in sorting the blocks by the initial consonant held in common, and building a tower from each type. (e.g., all the "B" consonant blocks stacked vertically, all the "C" consonant blocks stacked vertically, etc.).

When students are ready to match letters with initial sounds, they may be rewarded with an opportunity to play a game similar to "Go Fish." Each of a group of two to four students receives seven consonant picture blocks, selected from a group of four sets of consonant blocks. That is, the "deck" consists of four sets of 21 consonants.

The first player requests a particular consonant picture block from another player. If the other player has the block, the other player must turn it over to the first player, who continues to request blocks from any of the other players until the respondent does not have the requested block. At this point, the first player draws another picture block. If the drawn block matches the first player's request, the turn continues. Otherwise, the turn passes to the next student. When any player has four blocks starting with the same initial consonant, that player connects them together and places them in view of the others. Once all the blocks are matched, the game is over. The player with the most matches wins the game.

The exercises in this Example may be similarly practiced with initial vowel picture blocks, with the teacher placing an emphasis on the fact that vowels are vocalized with open mouth. This Example may likewise be practiced with a plurality of students or with a different number of consonants or vowels.

EXAMPLE 2

Alphabet Naming and Sequencing

This example is used to teach a student to match the names of letters with the letter symbols, initially with uppercase letters only (with the lowercase letters on the blocks optionally masked), then with lowercase letters only (with the uppercase letters masked), and finally with both uppercase and lowercase letters. In these exercises, students do drill work in which they describe the shape of letters; and match a selected alphabet block with letters from other sources, such as index cards each bearing a single letter, written versions of students' names, or logos for popular brand names. As they acquire proficiency, the students will match a plurality of letters simultaneously. Throughout this activity or series of activities, the teacher may remind the students that red-colored blocks are vowel blocks and blue-colored blocks are consonant blocks.

Further activities have students sequence the uppercase and lowercase letters in alphabetical order in an interlocked "train." Then sections of the alphabet are removed to provide practice in sequencing. Four or five blocks are interlocked, all of them in alphabetical order except one of them is a blank block. Students must replace the blank with the correct letter.

EXAMPLE 3

Matching Initial Sound of Picture Block to Alphabet Block

In this exercise, students match the sound of the initial letter for the word describing an image on a picture block to the appropriate alphabet block, snap-fitting them together. The snap-fitted blocks can then be readily checked by the teacher to confirm that the students grasp the concept. This snap-fitting feature also ensures that the joining of blocks is deliberate manipulation, not incidental or random movements as found with other letter systems such as tiles.

EXAMPLE 4

Isolating Terminal Sounds

As with initial sounds, a student may be taught to isolate the sound of the last letter from a word describing an image on a picture block by using the picture blocks in finger play and other activities.

EXAMPLE 5

Matching Terminal Sound of Picture Block to Alphabet Block

As with initial sounds, a student can match the sound of the last letter for the word describing an image on a picture block to an appropriate alphabet block. This reinforces alphabet recognition, even in the context of ending sounds.

Short Vowel Word Families Kit

Figure 6:
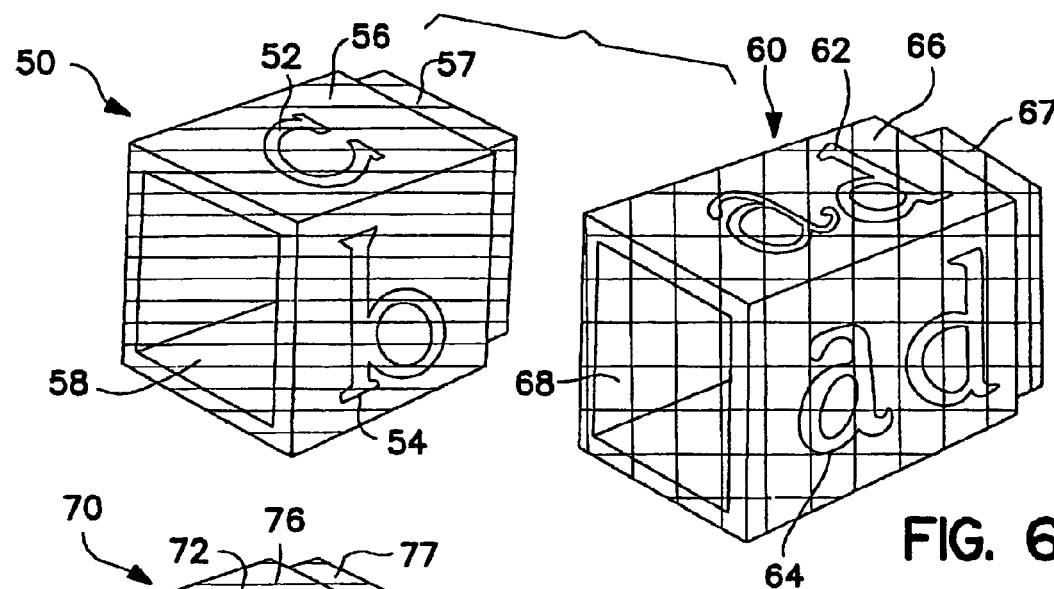
FIG. 6 is a perspective view of two blocks from the short vowel word families kit of the invention.

The short vowel word families kit has two types of blocks, initial consonant blocks and short vowel word or rime blocks. Rimes may also be referred to as phonograms. An initial consonant block 50 and a short vowel word block 60 are shown in FIG. 6. Users of this kit build on the skills acquired from using the alphabet and phonemic awareness kit.

The initial consonant blocks 50 feature different consonants 52, 54 on their four sides (including the combination "qu") and are one color 56, preferably the same color as that selected for the consonant blocks 20 in the alphabet and phonemic awareness kit. As with all blocks, the initial consonant blocks have a female end 58 and an opposite, male end 57. In one embodiment, the lettering on the blocks is as follows:

|         | Side 1 | Side 2 | Side 3 | Side 4 |
|---------|--------|--------|--------|--------|
| Block 1 | b      | c      | d      | f      |
| Block 2 | g      | h      | j      | l      |
| Block 3 | m      | n      | p      | qu     |
| Block 4 | r      | s      | t      | w      |
| Block 5 | y      | m      | l      | t      |
| Block 6 | r      | s      | b      | d      |
| Block 7 | k      | v      | x      | z      |

The short vowel phonogram blocks 60 (also now known by teachers and reading specialists as "rimes") are a color 66, which is different from the color of the initial consonant blocks and feature common two-letter combinations of vowels and terminal consonants 62, 64, such as "ad", "am", and "ed." In the preferred embodiment, the same two-letter combination is displayed on four faces of block 60 and a combination of four different initial consonants is featured on any selected initial consonant block 50. Examples of preferred rimes for the short vowel phonogram blocks are ad, am, an, ap, at, ed, en, et, in, it, ig, ot, og, op, up, ut, and un. The short vowel rime blocks, which carry more information on each side, are longer than the consonant blocks. The short vowel rime blocks also have a female end 68 and an opposite, male end 67.

Examples of Use of the Short Vowel Word Families Kit

The inventive short vowel word families kit provides students with motivating, hands-on experiences as they explore the alphabetic code system of the language and how to encode and decode new words and discover regular sound and spelling patterns among words with the same ending letters. Students who may be reluctant to do pencil and paper exercises especially may be encouraged to encode and decode new and familiar words and sort them into spelling patterns using these tactile, colorful blocks.

With the short vowel word families kit, students first explore the concept of rhyme. Then they manipulate short vowel patterns to create and decode many new words by connecting initial consonant blocks to rime blocks, creating a huge number of consonant-vowel-consonant words. They also begin to differentiate real words from nonsense words.

EXAMPLE 6

Exploring Word Families with the Blocks

A student combines one short vowel word block with the consonant blocks to create new words, repeating the combining step for other short vowel word blocks. The student learns to decode the new words by linking them to the spelling patterns of familiar words. Thus, a student may recognize the word "cat" and decode the word "hat" by analogy. Because each consonant block in this kit has a variety of consonants, a variety of real and nonsense words will be easily assembled. Taking the "at" short vowel as an example, a student could combine the consonant block 50 (bearing, for example, r, s, t and w), and create the familiar words rat and sat, and the less familiar word tat and the nonsense word wat, which reinforce the pronunciation of at family words even though they are unfamiliar or nonsense words. The ease of creating consonant-vowel-consonant combinations will encourage students to create and study all sorts of combinations. The interlocking feature of the blocks can help guide pronunciation of each new word as students are encouraged to pronounce the sound(s) on each block as they put them together; /s/ /at/, /s/ /at/, /sat/. By using two or more short vowel rime blocks in combination with the consonant blocks, students learn to sort by word families, by initial and final consonants as well as recognize short vowel sounds in the consonant-vowel-consonant patterns.

EXAMPLE 7

Exploring Word Families with the Short Vowel Word Families Kit and the Alphabet and Phonemic Awareness Kit The important practice of rhyming found in the short vowel word families kit is started in the alphabet and phonemic awareness kit. By identifying, matching and interlocking rhyming picture blocks from the alphabet and phonemic awareness kit, such as blocks showing a house and mouse or wig and pig, students focus on the auditory cues rather than visual cues to identify rhyming patterns. This provides an additional method of learning rhyming patterns. The interlocking feature provides a deliberate sorting mechanism rather than an incidental or haphazard movement of tiles into columns.

Other games and lessons teaching students using the alphabet and phonemic awareness kit and the short vowel word families kit, alone or in combination with published rhyming literature, will be readily apparent to those of skill in the art.

Phonics Word-Building Kit

The phonics word-building kit builds on the skills learned from using the short vowel word families kit. This kit has six types of blocks: consonant blocks; vowel blocks; "magic" e blocks; consonant combination blocks (including initial blends, final blends, word endings, and digraphs); vowel combination blocks (including digraphs, r-controlled vowels, and diphthongs); and two-to-four letter phonogram (or rime) blocks, which are shown in FIGS. 7 and 8.

Figure 7:
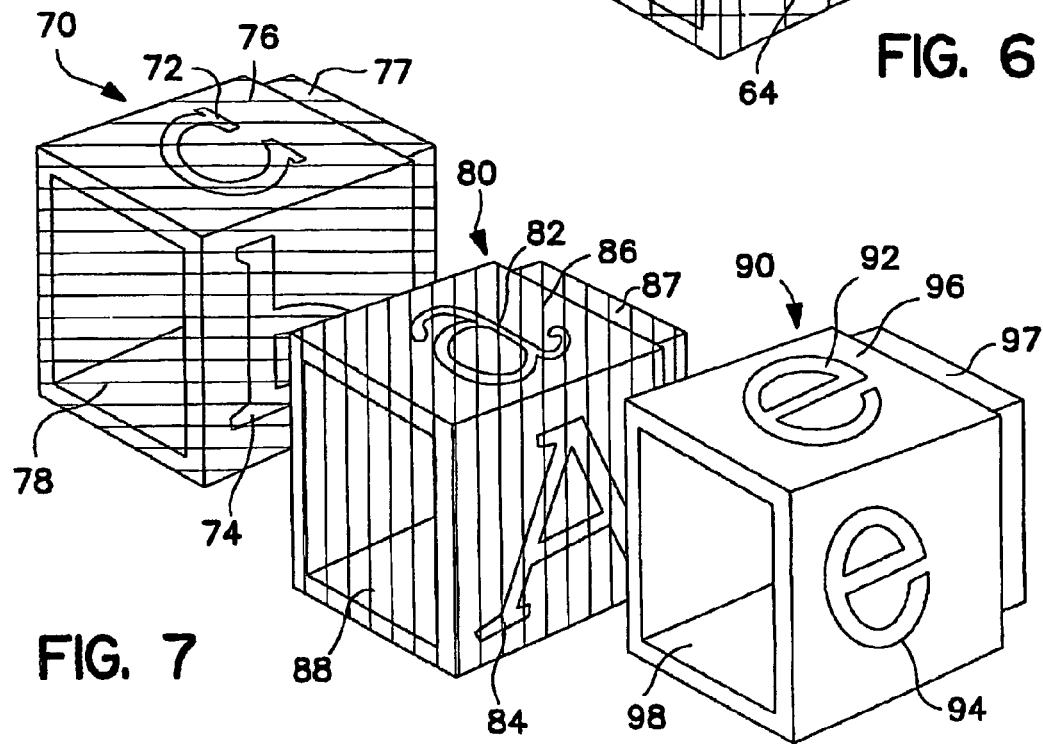
FIG. 7 is a perspective view of three blocks from the phonics word building kit of the invention.
Figure 8:
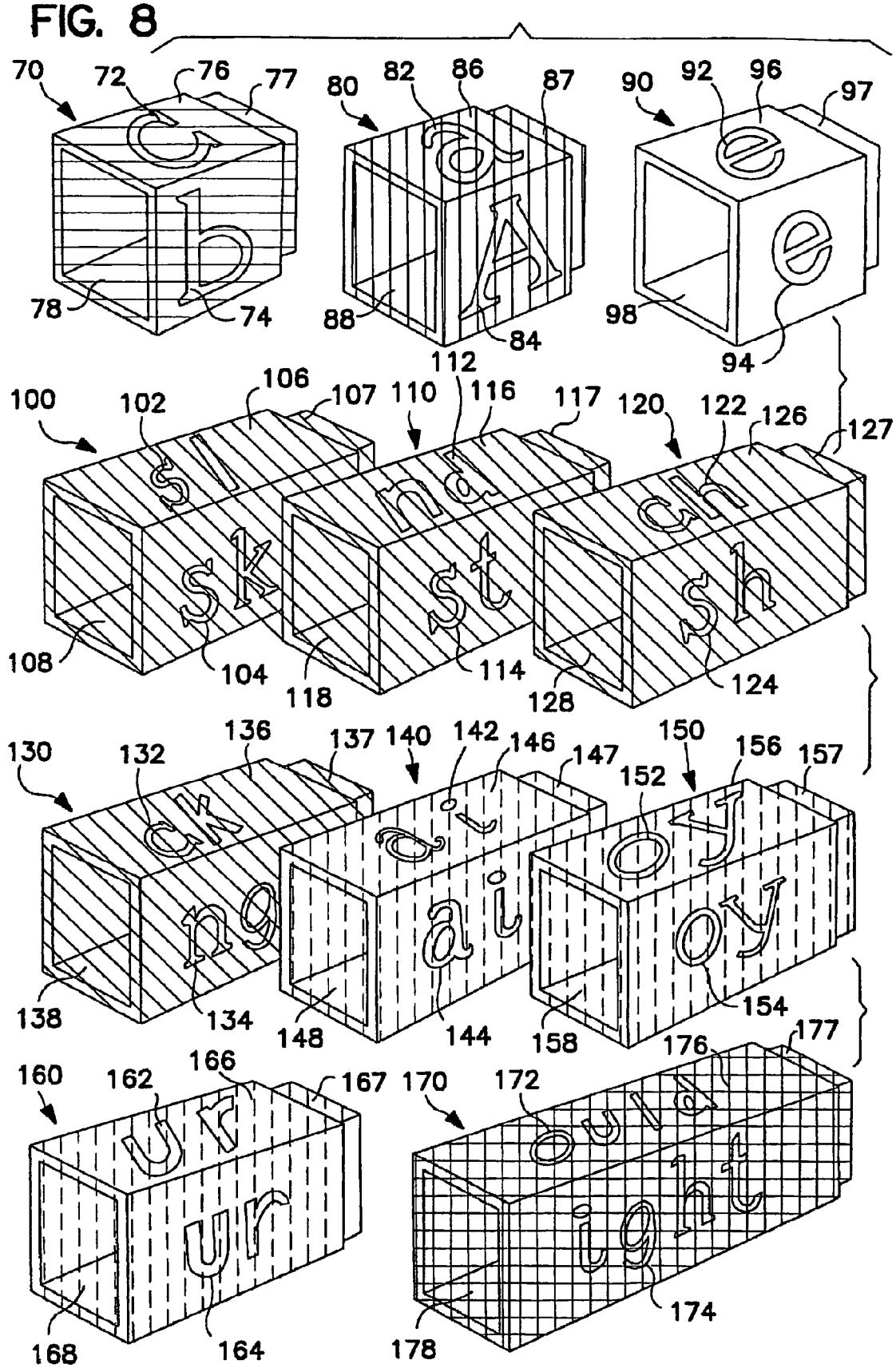
FIG. 8 is a perspective view of eleven blocks from the advanced phonics word building kit of the invention.

As seen in FIGS. 7 and 8, the consonant blocks 70 feature consonants 72, 74 on their four sides (including the combination "qu") and are one color 76, preferably the same color (for instance, blue) as that selected for the consonant blocks 20 in the alphabet and phonemic awareness kit. The consonant blocks have a female end 78 and an opposite, male end 77.

As seen in FIGS. 7 and 8, the vowel blocks 80 feature various vowels 82, 84 and are a color 86, which is different in color from the consonant blocks, and preferably the same color as that selected for the vowel blocks (for instance, red) in the alphabet and phonemic awareness kit. The vowel blocks have a female end 88 and an opposite, male end 87.

The "magic" e blocks 90 are a third color 96 (preferably white) and feature the letter e on the four sides, including sides 92, 94 shown in FIGS. 7 and 8. The "magic" e vowel blocks have a female end 98 and an opposite, male end 97. (The letter e can also be found on the vowel blocks for use when it is not silent.)

As seen in FIG. 8, the consonant combination blocks 100, 110, 120, 130 feature two or more consonants on each of their four sides and are one color 116, preferably a color related to, but different from, those used in the phonics word-building kit. In one embodiment, the consonant combination blocks are green.

The vowel combination blocks 140, 150, 160 feature two vowels on each of their four sides and are a color 141, preferably a color related to, but different from, those used in the phonics word-building kit. In one embodiment, the vowel combination blocks are violet.

The advanced rime blocks 170 feature multi-letter (usually two-four letters) word endings that use a commonly used spelling and pronunciation pattern, and are a color 176, preferably the same as that used for the two letter rime blocks from the short vowel word families kit (for instance, yellow).

Generally, the consonant combination blocks and the vowel combination blocks are longer than the vowel and consonant blocks 80, 70. The advanced rime blocks are somewhat longer than the consonant combination blocks and the vowel combination blocks, with the longer rimes being placed on longer blocks.

Examples of Use of the Phonics Word-Building Kit

The inventive phonics word-building kit provides students with motivating, hands-on experiences as they learn how to form and identify short-vowel and long-vowel sounds and patterns. Students learn to construct words using these vowel patterns and become familiar with various spelling conventions, including consonant-vowel-consonant pattern and the consonant-vowel-consonant-e pattern, using the "magic" e to transform a short vowel sound into a long vowel sound.

EXAMPLE 8

Learning to Manipulate Consonant and Vowel Blocks to Form Words with the Short a Vowel Sound The student is provided with the consonant blocks h, l, p, s (two blocks), and the vowel block a. The student and teacher may review the short a vowel sound. The student is then asked to form the following words from the blocks in the following order: pal, lap, sap, ask, sash, lass, pass, slap, slash, splash. After each word is formed and before the next word is formed, the student and/or teacher writes down the word. Then, the short a vowel sound is again discussed. Additional short a words may be formed as necessary or desired.

Other examples relating to this and other short vowel sounds using the phonics word-building kit will be readily apparent to those of skill in the art.

EXAMPLE 9

The "Magic" e

Once a student has grasped the short vowel sound, the student may be introduced to the long vowel sound by using the "magic" e block. The "magic" e block turns certain short vowel words into long vowel words. The student can learn this by manipulating the consonant and vowel blocks to transform consonant-short vowel-consonant words into consonant-long vowel-consonant-'e' words by simply adding the "magic" e block. Examples of this include: rat to rate, fat to fate, Sam to same, pet to Pete, sit to site, tot to tote, cut to cute, and hug to huge. Students may be introduced to this concept one vowel at a time. As another exercise, students can use the word pairs in sentences, such as: "The rat ran at a fast rate," or, "The fat cookie met its fate when Billy ate it."

Other examples relating to long vowel sounds using the "magic" e block from the phonics word-building kit will be readily apparent to those of skill in the art.

Advanced Sections of the Phonics Word-Building Kit

The advanced section of the phonics word-building kit builds on the skills learned from using the vowel, consonant, and "magic" e blocks. The blocks in this section are to be used with the phonics word-building kit, after separate study of the blocks featuring consonant combinations and vowel combinations as well as an advanced rime block type, examples of which are illustrated in FIG. 8.

The consonant combination blocks feature consonant combinations of four types: initial blends 100, final blends 110, consonant digraphs 120, and word endings 130. Blends are combinations of letters forming a merged sound. Examples of initial blends are sc, sk sl, sm, sn, sp, St, SW, bl, cl, fl, gl, pl, sl, br, cr, dr, fr, gr, pr, and tr. Examples of final blends are st, nd, nk, pt, and mp. Digraphs are a pair of letters representing a single speech sound, such as the wh in where or the ea in beat. Consonant digraph examples are sh, ch, ph, wh, kn, and gn. Word ending examples are ng, ck, tch, and dge. The initial blend blocks 100 have a female end 108 and an opposite, male end 107. The final blend blocks 110 have a female end 118 and an opposite, male end 117. The consonant digraph blocks 120 have a female end 128 and an opposite, male end 127. The word ending blocks 130 have a female end 138 and an opposite, male end 137.

Preferably, the consonant combinations are different on each of the four sides of any selected block, but each combination on a block has at least one thing in common with the other three combinations, namely, the type of combination (initial blend, final blend, consonant digraph, or word ending). For initial blends and consonant digraphs, the combinations on a given block preferably have a consonant in common. Thus, for example, a block could have sk, sl, sc and sm, which are all initial blends and all start with the letter s.

An example of preferred combinations of initial blend consonant blocks 100 follows.

|  | Side 1 | Side 2 | Side 3 | Side 4 |
|---|---|---|---|---|
| Block 1 | sc | sk | sl | sm |
| Block 2 | sn | sp | st | sw |
| Block 3 | sc | sp | sl | sw |
| Block 4 | sn | sk | st | sm |
| Block 5 | bl | cl | fl | gl |
| Block 6 | pl | sl | bl | cl |
| Block 7 | fl | gl | bl | cl |
| Block 8 | pl | sl | fl | bl |
| Block 9 | br | cr | dr | fr |
| Block 10 | gr | pr | tr | br |
| Block 11 | cr | dr | fr | gr |
| Block 12 | pr | tr | br | dr |

An example of preferred combinations of final blend blocks 110 follows.

|  | Side 1 | Side 2 | Side 3 | Side 4 |
|---|---|---|---|---|
| Block 13 | st | nd | nk | pt |
| Block 14 | nd | mp | st | nd |
| Block 15 | nk | pt | nd | mp |

An example of preferred combinations of consonant digraph blocks 120 follows.

|  | Side 1 | Side 2 | Side 3 | Side 4 |
|---|---|---|---|---|
| Block 16 | sh | ch | th | ph |
| Block 17 | sh | th | ch | wh |
| Block 18 | kn | gn | kn | gn |

An example of a preferred word ending block 130 follows.

|  | Side 1 | Side 2 | Side 3 | Side 4 |
|---|---|---|---|---|
| Block 19 | ng | ck | tch | dge |

The vowel combination blocks 140, 150, 160 feature vowel combinations of three types: digraphs, diphthongs, and r-controlled vowels. The vowel digraph blocks 140 have a female end 148 and an opposite, male end 147. A diphthong is a complex speech sound or glide that begins with one vowel and gradually changes to another vowel within the same syllable as in the oi in boil. The vowel diphthong blocks 150 have a female end 158 and an opposite, male end 157. The r-controlled vowel blocks 160 have a female end 168 and an opposite, male end 167. Examples of digraphs are ai, ay, ea, ee, oa, oo, ie, and ue. Examples of diphthongs are au, aw, ew, oi, ou, and oy. Examples of r-controlled vowels include er, ir, ar, ur, and or. Preferably, the same vowel combination appears on all four faces for any selected block.

The advanced rime blocks 170 have a female end 178 and an opposite, male end 177. Examples of preferred advanced rime combinations are ad, am, an, ap, at, ed, en, et, ig, in, ip, it, og, op, ot, ob, ug, un, up, ut, ace, ack, ade, age, ail, ain, air, ake, ale, all, ame, amp, and, ane, ang, ank, ape, are, ark, art, ash, ast, ate, ave, awn, aze, eak, eal, eam, ean, ear, eat, eck, eed, eek, eel, een, eep, eer, elt, eet, ell, end, ent, ess, est, ice, ick, ide, ies, ift, ike, ile, ill, ime, ind, ine, ing, ink, int, ipe, ite, ive, oat, ock, oil, oke, old, ome, one, ong, ook, ool, oom, oon, oop, oot, ope, ore, orn, ose, oss, out, ove, own, uff, ump, ung, unk, ush, ust, ute, ump, ould, ight, and ound. It will be noted that the two-letter rimes of rime blocks 60 are repeated in the advanced rime blocks 170. Unlike the earlier two-letter rime blocks, in the preferred embodiment of the advanced rime blocks, the same rime does not appear on all four faces for any selected block, but rather, four different rimes are featured on any selected block.

An example of preferred combinations of advanced rime blocks follows.

|  | Side 1 | Side 2 | Side 3 | Side 4 |
| --- | --- | --- | --- | --- |
| Block 1 | ad | am | an | ap |
| Block 2 | at | ed | en | et |
| Block 3 | ig | in | ip | it |
| Block 4 | og | op | ot | ob |
| Block 5 | ug | un | up | ut |
| Block 6 | ace | ack | ade | age |
| Block 7 | ail | ain | air | ake |
| Block 8 | ale | all | ame | amp |
| Block 9 | and | ane | ang | ank |
| Block 10 | ape | are | ark | art |
| Block 11 | ash | ast | ate | ave |
| Block 12 | awn | aze | eak | eal |
| Block 13 | eam | ean | ear | eat |
| Block 14 | eck | eed | eek | elt |
| Block 15 | een | eep | eer | elt |
| Block 16 | eet | ell | end | ent |
| Block 17 | ess | est | ice | ick |
| Block 18 | ide | ies | ift | ike |
| Block 19 | ile | ill | ime | ind |
| Block 20 | ine | ing | ink | int |
| Block 21 | ipe | ite | ive | oat |
| Block 22 | ock | oil | oke | old |
| Block 23 | ome | one | ong | ook |
| Block 24 | ool | oom | oon | oop |
| Block 25 | oot | ope | ore | orn |
| Block 26 | ose | oss | out | ove |
| Block 27 | own | uff | ump | ung |
| Block 28 | unk | ush | ust | ute |
| Block 29 | ump | ould | ight | ound |

Examples of Use of the Advanced Phonics Word-Building Kit

The advanced section of the phonics word-building kit, in combination with the preceding kits, is used to build reading skills relating to the sounds produced by combining two consonants or two vowels, and by combining more complicated combinations.

EXAMPLE 10

By snap-fitting two consonant blocks together, the idea of merged sounds, such as sk and other consonant blends, can be taught. Two consonant blocks that will blend together, such as an s block and a k block, can be stirred together in a paint jar by the teacher as a visual aid to illustrate blending or mixing the sounds together, just as two colors can be blended to form a new color. The two blocks can then be snap-fit together, and the resulting consonant combination can be verbalized. The connected blocks can be shown to the students as a visual reminder that the blended letters and sound are used together in the word.

It is preferred that the students first learn about the initial consonant blends in groups having a common first letter ("initial blends"). For instance, the "s blends" (sp, sk, sl, st, and sw) are a good group to start with. Once the concept of a blend has been introduced, the consonant blend blocks can be substituted for the individual consonant blocks. These can be joined with rime blocks and the consonant and vowel blocks of earlier-described kits to complete the formation of words having an initial letter blend. The words can be transcribed by the students, providing an additional method of learning words.

Similarly, the blends comprising a terminal sound of a word ("final blends") can be likewise taught using the paint mixing analogy.

Then, the concept of a digraph can be taught to the students—indicating that the blended consonants produce an entirely new sound, such as /sh/, /ch/, /th/, /wh/, and /ph/. Students should hear and then use their digraph blocks in combination with earlier-described blocks to form words containing the digraph sounds.

The silent combinations /kn/ and /gn/ and the unusual spelling patterns using /ng/, /ck/, /tch/, and /dge/ can be similarly taught. The vowel combinations (digraphs, diphthongs, and r-controlled) can then be taught, using the blue consonant and green consonant combinations to help build words that use the various vowel combinations.

The students can then use the advanced rime blocks in combination with consonant blocks and consonant combination blocks to learn and practice spelling words with common spelling patterns, much as the students did with the vowel-consonant rime blocks described earlier, although the focus now becomes long and other vowel sounds rather than short vowel families.

A group of students can play a game like "Telephone" or "Gossip" by starting with one short vowel-consonant rime block 170 and the consonant and consonant combination blocks 70, 100, 120 described earlier. The short-vowel-consonant rime block is passed through the students, with each student changing the beginning sound to form a new word. When a student cannot form a new word, then a new rime block is selected.

Other word study exercises using this kit will be readily apparent to those of skill in the art.

Prefixes, Suffixes and Root Words Kit

The prefixes, suffixes and root words kit builds on the skills learned from using the complete phonics word-building kit. This kit has five types of blocks: affix blocks 180, 190 (including both prefixes and suffixes), root word blocks 200 (Greek and Latin roots), English base word blocks 210 and single vowel and consonant blocks for spelling changes (not shown). Examples of these blocks are shown in FIG. 9. As the amount of information on the sides of the blocks increase, the length of the blocks increase.

The affix blocks are of two types: prefix blocks 180 and suffix blocks 190. The prefix blocks 180 feature commonly used prefixes on each of their four sides and are one color 186. The prefix blocks 180 have a female end 188 and an opposite, male end 187.

The suffix blocks 190 feature commonly used suffixes and word endings on each of their four sides and are a second color 196, preferably a color different from, but related to, that used for the prefix blocks. Thus, if the prefix blocks were yellow, the suffix blocks could be orange. The suffix blocks 190 have a female end 198 and an opposite, male end 197.

Examples of preferred prefixes for the prefix blocks are: re, in, un, di, il, sub, ad, en, ex, de, ir, co, ab, a, im, ob, pre, mis, mid, con, sub, uni, bi, tri, non, com, tele, anti, pro, para, ante, over, mono, multi, dis, semi, per, trans, auto, deci, post, mega, under, super, micro, milli, centi, kilo, and inter.

Examples of preferred suffixes for the suffix blocks are: ize, or, al, en, ty, ly, li, y, s, es, er, ed, ent, ee, ing, ic, ify, ity, ant, ate, est, ish, ful, ist, ive, tude, ion, ous, logy, tion, nomy, ment, able, ible, less, ward, ence, sion, hood, ness, ance, and ure.

The English base word blocks 200 feature commonly used English base words and are a third color 206. The English word blocks 200 have a female end 208 and an opposite, male end 207. The Greek and Latin root blocks 210 feature Greek and Latin root words and are a fourth color 216, preferably a color different from, but related to, that used for the English word blocks. Thus, if the English word blocks were green, the Greek and Latin root blocks could be light green. The Greek and Latin root blocks 210 have a female end 218 and an opposite, male end 217.

Examples of preferred English words for the English word blocks are: like, kind, help, hug, bat, win, run, wash, stop, hop, pet, city, baby, play, back, act, cycle, fair, soft, pass, hunt, safe, sign, test, plan, warn, self, farm, work, home, look, state, spell, clean, treat, agree, order, care, store, line, date, light, force, build, float, place, create, carry, legal, angle, reason, comfort, friend, annual, wonder, brother, sister, develop, employ, month, enjoy, and south.

Examples of preferred Greek and Latin roots for the Greek and Latin root blocks are: ped, bio, vis, alt, ver, cit, zoo, fus, not, port, duc, gram, geo, vent, ject, naut, cede, pend, scop, grat, sect, spec, form, cred, vers, vert, sens, dict, therm, rupt, photo, astro, meter, press, graph, metr, scrib, poli, tract, struct, aud, and phon.

The single letter vowel blocks preferably carry the vowels a, e, i, o, and u, and are similar in color to the vowel blocks of earlier-described kits. The single letter consonant blocks carry the consonants t, n, d, r, g, p, m, and b and are similar in color to the consonant blocks of earlier-described kits.

When students have acquired knowledge of the alphabetic principle and recognize patterns across words (skills developed in previous kits), they are ready for word analysis to build vocabulary and spelling skills. This set allows users to practice adding prefixes and suffixes to root words and base words, and to learn spelling conventions for adding the affixes. Building and analyzing words in this way is sometimes called "structural" or "morphemic analysis." A morpheme is the smallest unit of meaning in a language. For example, "cats" has two morphemes, cat plus the plural s. In this example, the morpheme cat is a free morpheme and can stand alone, whereas s is a bound morpheme, which needs to be added to another morpheme to convey its meaning. Prefixes and suffixes are bound morphemes.

Examples of Use of the Prefixes, Suffixes and Root Words Kit

Students combine -s, -es, -ing, and -ed blocks with English root word blocks. This allows them to learn appropriate and inappropriate combinations, such as which suffixes work with verbs and which with nouns; for example, helps (not helpes), helping, or helped; or friends (not friendes), friended or friending. From this exercise, they will also learn pronunciation rules, such as that washed is a single syllable word.

Students can also learn that the final e is dropped from words when certain suffixes such as ing are combined with a verb that ends in e. Learning this rule is facilitated with spelling variations of words included on the same block; for instance place and plac; create and creat, care and car, and store and stor are paired on their respective blocks. Learning spelling rules involving plurals of words that end with a consonant and ay such as baby and babies is also made possible with spelling variations on the blocks (baby and bab; city and cit; carry and carr).

Students first combine suffixes with English base words, then prefixes. With the color coding of the blocks, they can easily see what is base and what is affix, making applying the rules more understandable and consistent. In these exercises they learn that not all combinations form real words and they learn to generalize about the effect an affix has on the meaning of a word by analogizing from the known effect in a known combination, to the effect in an unknown combination.

Being able to manipulate the blocks reinforces the idea of many words being made up of discernable parts with predictable meanings. For instance, students learn that adding the suffix er to a verb transforms the verb into a noun with the meaning "someone or something that can [verb]." They learn that adding the suffix est to a noun forms a nonsense word, but when added to an adjective, forms a comparative adjective—just as when adding the suffix er to an adjective. In this exercise, the consonant doubling rule is reviewed when the suffix er is added to "stop." The students learn the general rule that a consonant is doubled when the suffix begins with a vowel (ed, ing, and er). The single consonant blocks make this doubling possible.

Students learn that the suffix able transforms a verb into an adjective, and the suffix ly transforms an adjective into an adverb. They then learn that a verb combined with "able" can be further transformed into an adverb by adding ly to form verb-able-ly (e.g., comfortably). Grasping all these concepts can be readily visually checked by confirming that the correct color blocks are assembled in the correct order, without necessarily reading the blocks or having to write anything. Spelling variations, including dropped e, are included on the same block as the complete word to make studying the rules manageable. For instance, like and lik, and live and liv, are paired on their respective blocks. Students also review the "magic" e spelling rule.

Students learn the effects of the different prefixes, preferably starting with the set in, im, and un, when combined with English base word blocks, such as fair, kind, safe, and lock. Greek and Latin root word blocks may be introduced at this time, showing the students the effect of combining two bound morphemes, such as in- and -vert. Students learn the meaning of the various prefixes, such as un means not. Students combine the prefix re block with base and root word blocks, learning to generalize from the context that re means again. Other prefixes and suffixes can be added to the study. Students can also learn the meaning of the Greek and Latin root word blocks from their context and learn how the roots can be combined with many prefixes and suffixes to form new words, with a meaning that can be determined, because of what those skilled in this art call "derivational constancy," from the meaning of the subparts.

To help synthesize all the various exercises, students combine the different prefixes, base words, root words, and suffixes to make word families. Word families are made visually clear because of the color-coding of the blocks; this, in turn, makes spelling patterns easier to identify and remember.

Sentence-Construction Kit

The sentence-construction kit builds on the skills learned from using the earlier kits. As seen in FIG. 10, this kit has twelve types of blocks: noun blocks 220, noun ending blocks 320, pronoun blocks 230, verb blocks 240 (including verb ending blocks 330), adjective blocks 250, adjective ending blocks 260, adverb blocks 270, preposition blocks 280, conjunction blocks 290, interjection blocks 300, and punctuation blocks 310. As the amount of information on a block's side increases (e.g., the length of word increases), the length of the block increases. All these blocks have a female end and an opposite, male end.

In the preferred embodiment, the noun blocks 220 are a color 226, such as green. The noun ending blocks 320, such as or, er, es, s, ment, tion, sion, ion, es, ness, and ing, are also the first color 226. The noun blocks each generally have four different nouns on the four sides. The noun ending blocks 320 each generally have four different noun endings on the four sides.

The pronoun blocks 230 are a second color 236 related to the color 226 of the noun blocks, such as light green, and each generally has four different pronouns, selected from I, he, her, him, his, it, its, me, my, she, our, ours, we, who, you, us, their, them, they, theirs, which, your, yours, and what, on the four sides. The following table provides a few examples of noun and pronoun blocks.

|  | Side 1 | Side 2 | Side 3 | Side 4 |
| --- | --- | --- | --- | --- |
| Noun Block 1 | air | bat | boy | car |
| Noun Block 2 | cat | Dad | dad | day |
| Noun Block 3 | dog | end | eye | fun |
| Noun Block 4 | hen | man | men | Mrs. |
| Noun Block 5 | Mom | mom | Mr. | mitt |
| Noun Block 6 | baseball | birthday | children | hamburger |
| Noun Block 7 | ball | bird | book | city |
| Pronoun Block 1 | His | his | her | Her |
| Pronoun Block 2 | I | us | its | me |
| Pronoun Block 3 | my | My | Our | our |

The verb blocks 240 are a third color 246, such as yellow. The verb ending blocks 330, such as n, ing, ed, and s, are also the third color. Each verb block generally has four different verbs on the four sides, but the different verbs may include present and past tense or plural and singular forms of an irregular verb on any given block. Thus, for instance, a block may have: ride, rode, tell and told; or know, knew, leave, and left; or, am, is, are, and be; or sing, sang, sung, and a fourth verb, such as thank, which is not irregular.

The adjective blocks 250 are a fourth color 256, such as red. The adjective ending blocks 260, such as er and est, are also the fourth color 256. Each adjective block generally has four different adjectives on its four sides. One adjective ending block carries er and est twice on its four sides, while other adjective endings, such as able, ible, ous, and ious are on another block. Special adjectives, known as articles, including a, an, and the, are included on a block of another color, such as pink, that is related to the fourth color.

The adverb blocks 270 are a fifth color 276, such as orange. Each adverb block generally has four different adverbs on its four sides.

The preposition blocks 280 are a sixth color 286, such as blue. Each preposition block generally has four different prepositions on its four sides. The prepositions may be selected from the group, as, at, by, for, in, of, off, on, out, to, up, in, above, about, after, along, away, down, even, from, into, near, next, with, since, upon, over, until, across, against, around, under, between, during, before, toward, without, and through. In the preposition blocks, as with all blocks in this set, blocks may include blank sides so that users can choose other prepositions and write them with a permanent or dry erase marker.

The conjunction blocks 290 are a seventh color 296, such as violet. Each conjunction block generally has different conjunctions on its sides. The conjunctions may be selected from the group and, but, for, if, or, so, and, but, because, while, and yet.

The interjection blocks 300 are an eighth color 306, such as turquoise. Each interjection block generally has different interjections on its sides. The interjections may be selected from the group: Gee, No, Oh, Wow, Hey, Yes, OK, and Aha. Because interjections generally start sentences, it is preferred that the interjections have initial capital letters.

The punctuation blocks 310 are a ninth color 316, such as white. Each punctuation block generally has different punctuation marks on its sides. The punctuation marks may be selected from the group: comma, period, exclamation mark, question mark, quotation mark, opening parenthesis, closing parenthesis, semicolon, colon, single quotation mark (or apostrophe), double quotation mark, and hyphen or dash.

Examples of Use of the Sentence-Construction Kit

Figure 11:
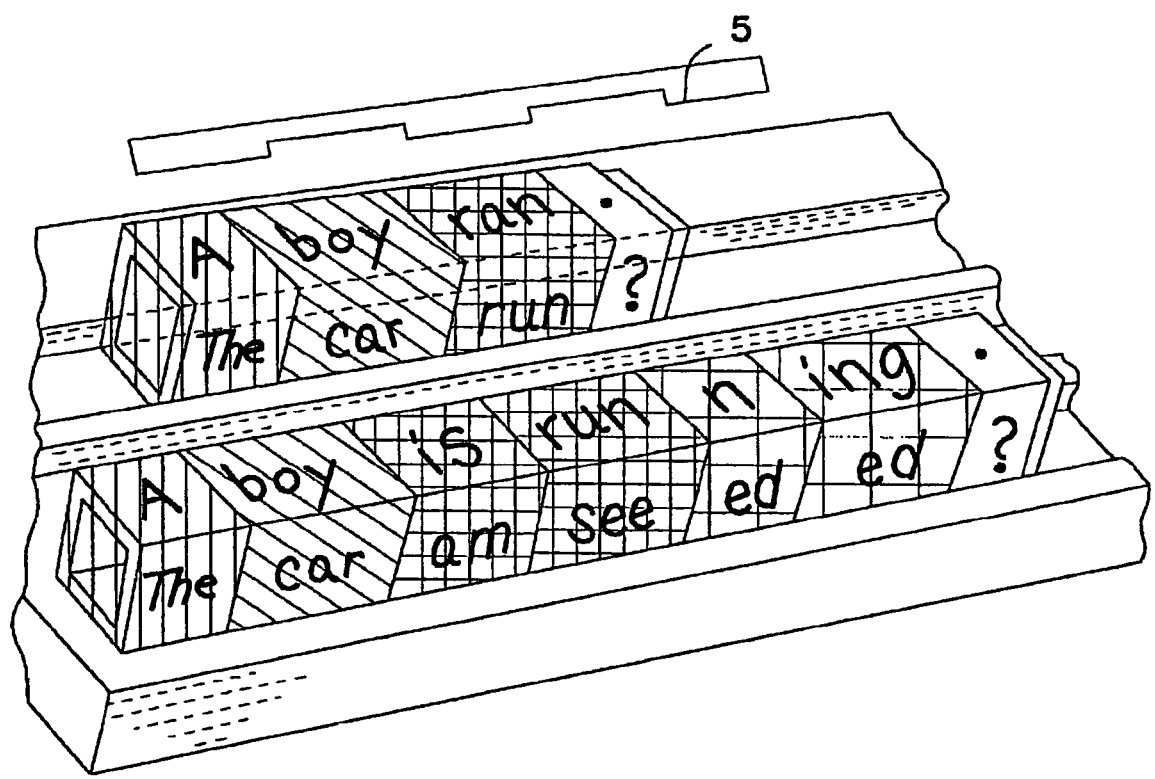
FIG. 11 is a perspective view of a tray holding blocks of the invention.

One component of grammar is understanding the structure of sentences. FIG. 11 illustrates blocks from the sentence-construction kit assembled to form two related sentences. Sentence combining and expanding activities have a strong tradition in language instruction and have been shown to improve some students' writing. Using the sentence-construction kit allows students to learn the formal structures of language while analyzing, combining, organizing, elaborating, and rearranging sentences using manipulable materials rather than the more tedious and boring writing and rewriting. The colored blocks enable easy identification of nouns, verbs, adjectives and other parts of speech, and make instruction in the various formal sentence structures easy. In addition, students can combine words in interesting and unusual ways.

Using this kit, students can learn to recognize nouns and verbs. The snap-fitting and color-coding features will help them learn to identify—and separate into component parts—simple, compound, and complete subjects and predicates in sentences. They will also learn to identify sentence fragments by the absence of certain colored blocks. The color-coding feature will help students identify action verbs and their helpers and differentiate the helping verbs from linking verbs. They will learn about punctuation, prepositional phrases, adjectives, adverbs, interjections, and conjunctions. In short, using this kit will allow the formation of essentially any type of sentence, and will facilitate drill work in all the various types of grammatical work so important to writing readable sentences.

EXAMPLE 11

Recognizing Nouns

Students use only the noun blocks, which are sorted out by color. First, students can practice their classifying skills by sorting the noun blocks by their initial sounds, just as they did with the picture blocks in the alphabet and phoneme awareness kit. As they master this sorting, they can sort by terminal sounds, and by long and short vowel sounds.

Having acquired familiarity with some of the words on the noun blocks and refreshed their sorting skills, students can then sort the noun blocks by type of noun. Thus, students may sort the noun blocks by words that refer to people, to things, to ideas or concepts, and to places. As they sort, the teacher explains that people, things, ideas, and places are words called "nouns".

To reinforce this exercise, students play a noun connection game. In this game, a first student selects a noun on a noun block and gives it to a second student. The second student finds a second noun block that is related to the first noun block, snap-fits it to the first block, and explains how the two nouns are related. For example, if the first noun was boy, the second noun might be dad because the boy has a dad. This exercise, and the building of the "noun train," continues until the blocks are used up or the students can no longer relate the two touching nouns to each other.

EXAMPLE 12

Recognizing Verbs

Students use only the verb and verb ending blocks, which are selected by color (e.g., yellow). The teacher begins by showing the students an observable action verb on a verb block, such as the word eat. The student verbalizes a sentence using the verb. Using this sentence, the teacher explains that the word eat describes an action and that action words are called verbs. After discussing that the verb eat describes an observable action, students look through the yellow verb blocks for other observable action verbs, thus reinforcing the concept of action verbs.

Next, the teacher shows the students a verb block with an action verb that cannot be observed, such as the word think. The teacher explains that this is also a verb although it cannot be seen—someone cannot see someone else think. Students then should look through the verb blocks for other non-observable action verbs.

Next, the teacher shows the students a verb block with an irregular past tense and present tense form of a verb, e.g., ride and rode. The students use these verbs in a sentence. The teacher explains that these are present and past tense forms of the verb "to ride" and further explains that the present is what is happening now and the past is what has happened. Students then look through the verb blocks and identify other blocks with present and past tenses of verbs.

Students locate their verb ending blocks, or blocks with ed on one side. The students and teacher discuss what connecting ed to present tense forms of regular verbs does to the verb. To reinforce this, students combine various verb blocks with ed to make the past tense forms. When a student tries to make a regular past tense form of a verb with an irregular past tense (e.g., "maked"), the concept of irregular past tenses should be introduced, along with pointing out that the irregular past tense ("made") is already on the block.

To reinforce these exercises, students can play a verb connection game, much like the noun connection game described earlier, but linking the verbs together with an explanation.

One of skill in the art will recognize that the invention can be similarly used to introduce and examine the concepts of adjective and adverb recognition.

EXAMPLE 13

Making Sentences

This example uses the entire sentence-construction kit.

Initially, students form various sentences from the blocks in their kits, including a period at the end of the sentences. Students may not be able to start their sentences with a capital letter, so the teacher can suggest using self-stick notes on cubes or using a dry erase marker to write the word on the blank cube.

EXAMPLE 14

Identifying Complete Subjects and Complete Predicates

Then, the teacher forms a sentence from the blocks, such as "My dad got a fish for me." Using the preferred color scheme, the following table shows the color of each block.

| My | dad | got | a | fish | for | me | . |
|---|---|---|---|---|---|---|---|
| light green | green | yellow | pink | green | blue | light green | white |

The teacher then breaks the assembled sentence into two parts: "My dad" and "got a fish for me." The teacher explains that "My dad" is the complete subject of the sentence because it tells who or what is doing something and that "got a fish for me" is the complete predicate because it tells what the subject did.

The students then take their assembled sentences and separate them into complete subjects and complete predicates. Each student explains why the sentence was split in the selected location. By the end of this exercise, students should have noticed that subjects do not have the main verb of the sentence (a yellow block) while predicates always have the main verb. Physically splitting and joining the blocks is an important characteristic of this invention.

EXAMPLE 15

Identifying Simple Subjects and Simple Predicates

The concept of a simple subject and simple predicate can now be introduced, using a sentence such as "The happy children play in the rain." First, the blocks are split so as to form two parts: "The happy children" and "play in the rain." After identifying the complete subject and the complete predicate, the children and play blocks can be isolated and identified as the simple subject and the simple predicate. The teacher explains that the simple parts tell who does what, without any additional information.

Further drill work involves making more sentences, including those with compound subjects and predicates, and breaking them down, first into complete subjects and complete predicates, and then into simple subjects and simple predicates. An additional exercise entails making several sentences, breaking them up and mixing them up, then having students identify which subjects and predicates go together.

EXAMPLE 16

Identifying Complete Sentences and Sentence Fragments

The teacher makes the sentence fragment "The man and the duck." The teacher asks the students if there is a yellow block in the sentence and what sort of words are on yellow blocks. The teacher instructs the students that every sentence must have a verb, and that, therefore, all sentences made with the sentence-construction kit will have a yellow block. The students and teacher complete the sentence with a verb block. Using color-coding is an important feature of the present invention.

The teacher (or students) makes the sentence "We went to the store and got a dog." The sentence is then broken into "We went to the store" and "and got a dog." The students identify "We went to the store" as a sentence and "and got a dog" as a sentence fragment because it has no subject even though it has a verb. The students learn that a complete sentence requires both a subject and a verb.

EXAMPLE 17

Identifying Basic Sentence Patterns

In this exercise, the teacher makes the sentence "Children play." using the blocks. The teacher and students identify the colors and types of blocks used to make this sentence, which, using the preferred colors, will be a green noun block and a yellow verb block. The students learn that the noun-verb (N-V) pattern is the simplest sentence pattern. To reinforce this, the students form other noun-verb combinations, which may make sensible or nonsense sentences.

The teacher then adds the article block having the word "The" to the sentence, forming the new sentence "The children play." The teacher informs the students that "the" as well as "a" and "an" are a special kind of adjective known as an article—which is why the blocks are pink, but that articles do not change the basic sentence type. Thus, the sentence pattern is still noun-verb.

The teacher then adds the noun block having the word "ball" to the end of the sentence, forming the new sentence "The children play ball." The children identify the colors and types of blocks used to form this sentence and learn a second sentence pattern: noun-verb-noun (N-V-N).

The teacher forms a new sentence from blocks: "Dad is funny." The children identify the colors and types of blocks used to form this sentence and learn a second sentence pattern: noun-verb-adjective (N-V-Adj.).

Students then practice forming sentences of the three different patterns using the blocks. The teacher assesses students' understanding of the concept by looking at the colors of the blocks, and examines the various sentences for content. Ease of assessment is an important feature of the present invention.

EXAMPLE 18

Identifying Types of Sentences

The teacher forms the sentence "Which dog jumped over the wall?" from the blocks. The students and teacher discuss the different blocks used in this sentence and specifically identify the punctuation block ? used. The teacher tells the students that a question is a sentence asking for information. The teacher uses the blocks to form the sentence "The black dog jumped over the wall." The teacher and students identify the absence of a question mark. The teacher tells the students that this sentence is a statement and a statement is a sentence giving information.

The students are divided into pairs. Each student then forms questions using their blocks. The teacher checks their questions for form and content. The other student in each pair uses blocks to form a statement that answer the question. The questioning and answering may be repeated as necessary. The converse may also be done, in which first a statement is formed and then the other student turns it into a question. The statement-forming and questioning may be repeated as necessary.

The sentence "Stop doing that" is formed from the blocks and used to introduce the concept of a type of sentence known as a "command." The students and teacher attach, and discuss the effect of, two forms of punctuation: a period and an exclamation point. They read each form of the sentence aloud, changing the urgency with the tone of their voice. Students build other commands, such as "Bring my book." and "Close the door." and proceed in similar way to judge the effect of an exclamation point on meaning. Students will continue to discuss the differences between commands ending with periods and exclamatory statements that end with exclamation points.

Students then form a sentence in the form of a statement, such as "Dad read this book." They identify the basic pattern (noun-verb-noun, in this case) and then turn the sentence into the command: "Read this book." Students discuss the basic pattern of the command sentences, where the subject is understood as "you." The pattern is written (you)-verb or (you)-verb-noun. Students can also be shown how the word "please" is used to transform the commands into requests.

The students are divided into pairs. Each student then forms questions, commands, requests, and exclamatory statements using their blocks. The teacher checks their sentences for form and content. The other student in each pair uses the same blocks and others to form a related, but different form of, sentence. These steps may be repeated as necessary. Throughout, periods and exclamations points are used, and oral emphasis is appropriately provided.

EXAMPLE 19

Using Adjectives and Adverbs

In this exercise, students learn the appropriate use of adjectives through sentence expansion. The blocks are used to form the sentence "The man saw a duck." First, the noun concept is reviewed and students identify the noun blocks by color and definition. Students then modify the sentence by adding the adjective block with the word big on it, forming the sentence "The man saw a big duck." Students identify the adjective blocks by color. The teacher explains that adjectives add information about nouns and pronouns and are words describing nouns and pronouns.

Students then use the snap-fitting feature of the blocks to easily modify the sentence by adding the happy adjective block, forming the sentence "The happy man saw a big duck." They identify both adjectives (as well as the article blocks that are a related color) and which noun each adjective describes. Students further quickly and easily modify the sentence to read "The large man saw a big duck and was happy." They identify the three adjective blocks and which noun each adjective describes. This introduces the concept that nouns and the adjectives that modify them do not need to be adjacent. The quick and easy modifications are an important feature of the present invention.

Students continue in this by forming their own sentences from the blocks, using adjectives generously. One exercise could involve a first student forming a simple noun-verb-noun statement from the blocks and passing it to the next student, who adds an adjective. The sentence blocks are passed until time is up, everyone has had a turn, or the ideas are used up. Then, the sentence blocks may be quickly and easily rearranged so that the adjectives modify different nouns. The consequences of the rearrangements on sentence meaning are also considered.

EXAMPLE 20

Using Conjunctions

Students form the sentence "My brother hit the ball." from the blocks. They then add blocks forming the phrase "and ran quickly", resulting in "My brother hit the ball and ran quickly." The adverb block is identified, along with the other block colors. The conjunction block (preferably violet in color) is discussed as is its effect of joining or connecting two parts of a sentence. Students substitute blocks forming the phrase "but ran slowly" for the blocks "and ran quickly" and discuss the effect on meaning and why using the conjunction block "but" requires an adverb change. Students learn that and, but, and or (nor) are coordinating conjunctions.

Students form the sentence "If the man sometimes saw the duck, he was happy." from the blocks. After identifying the various blocks, including the violet "if" conjunction block, students discuss that a conjunction does not have to be between the two phrases it joins or connects. This type of conjunction is called a subordinating conjunction because the clauses it joins are not equal, one depends on, or is subordinate to, the other. Students may rearrange the sentence so that it reads "He was happy if the man sometimes saw the duck." and discuss the meaning of this new sentence. Students then sort out the conjunction blocks and read all of the conjunctions: and, but, for, if, or, so, and, but, because, and while. Students form sentences using the different conjunctions and examine the various locations and uses of the conjunction. Then, students replace one conjunction with another conjunction—changing the rest of the sentence as necessary so the sentence makes sense.

As another exercise, a first student forms a simple noun-verb-noun statement from the blocks and passes it to the next student, who adds a new phrase or clause with a conjunction. The student writes down the new sentence. The sentence blocks are passed, with each student changing the conjunction and other words as necessary and writing down the resulting sentence (keeping the original noun and verb blocks as long as possible) until time is up, everyone has had a turn, or the ideas are exhausted. Then, the changes in the sentence over time are reviewed and the effects of conjunctions on content are considered.

EXAMPLE 21

Other Uses of the Present Invention

As can be seen from the foregoing examples, the present invention is extremely versatile. One of skill in the art will recognize that the invention can be similarly used to introduce and examine the concept of compound subjects and compound objects, compound predicates, compound verbs, coordinating conjunctions; the use of commas to separate long independent clauses, subordinating conjunctions; the use of commas in a series and after long introductory phrases and clauses; subject-verb agreement; the nature of pronouns including singular and possessive pronouns and pronoun-verb agreement; subject-verb agreement; identifying different sorts of adjectives (e.g., article, quality, quantity) and making adjectives from verbs by adding the suffixes "able" or "ible"; identifying prepositions and working with prepositional phrases; using single, plural, and possessive noun forms; adding the suffix "ness" to adjectives to make nouns; making verb tense changes, including the present and past tenses, the future tense with "will" and the present progressive tense ("is [verb]ing"); use of linking verbs (e.g., looks, feels, seems, am, is, are, was, were, be, being, been, become, feel, grow, look, seem, smell) to express a state or condition of the subject linked to a noun or to an adjective that describes the subject; use of helping verbs to help the main verb express time (e.g., am, is, are, was, were, be, been, do, did, have, has, had, will, can, may, might, could, should, would); using comparative and superlative adjectives (including the addition of -er and -est suffixes and many/more/most and good/better/best); identifying adverbs by kind (place, time, manner, and degree); identifying pronouns used as subject or as object; using quotation marks to signify direct speech and correctly using punctuation in relation to quotation marks; and using common interjections in writing; using parentheses, colons and semicolons.

EXAMPLE 22

Primers

The universally connectable blocks may also be used in conjunction with one or more primers. Primers, or books that are designed to teach children various, selected aspects of reading, such as letters, vowel and consonant sounds, combinations of vowels and consonants, rimes, parts of speech, and punctuation, are known in the art. However, the novel method for teaching and learning reading described here combines primers and blocks in ways that were previously not known. Each primer, itself designed to teach a selected reading skill, has been developed with color-coded letters or other symbols that correspond to the blocks' color coding. The primers provide stories or display words, sentences or phrases and corresponding illustrations, together with manipulative (hands-on) exercises that involve the blocks. Thus, using the primers and blocks together provides both a literary and a manipulative, hands-on, tactile learning context to the teaching and learning of reading. Using a primer together with block-based hands-on activities designed to teach and reinforce the reading skills covered by the primer provides the reader with a better understanding of the learning concepts and strengthens reading skills in a uniquely powerful and effective fashion. This effective and powerful improvement over traditional primer-based teacing of reading skills derives from the lasting memory of the physical act of snapping the blocks together, linked with both the reading skill being taught and the content or story line of the primer. This experience is different from merely reading symbols on a page. The lesson is "burned in" twice and more effectively, with two kinds of experiences and memories (reading and hands-on learning).

The primers are different from the earlier-described flip-books because the primers teach reading skills with letters, pictures, words and/or stories in conjunction with the blocks whereas, the flipbooks are mere instruction guides with one or two page-long activities or exercises for drilling the user in how to use the blocks without literary reinforcement or story lines, lacking the experience of reading a "book."

The primers and universally connectable blocks are designed to be used together (and have been integrated) to teach and learn reading. Each primer contains selected intelligible reading units composed of reading indicia that correspond to the reading indicia found on the faces of the blocks. Each block has a single type of reading indicia. The selected reading indicia in the primer are the same color as the blocks that have the corresponding reading indicia.

In one method of using the primers and blocks, an intelligible reading unit is selected from the primer after the child has completely or partially read the primer. The user identifies the reading indicia comprising the selected intelligible reading unit and selects a first and a second block from the group of universally connectable blocks having the identified reading indicia. The selected blocks are connected by the user so that the connected blocks are horizontally adjacent and the selected indicia-bearing faces of each block are visible from the same direction. To determine whether the indicia appear together to form the selected intelligible reading unit, the color or selected indicia of the connected blocks are viewed. If the selected intelligible reading unit is not formed, then one or more of the connected blocks are disconnected. One or more blocks are rotated or the blocks are connected in a different order or different blocks are used, resulting in different indicia-bearing faces being adjacent to each other. Other ways of using the primers and blocks may also be envisioned.

Figure 12:
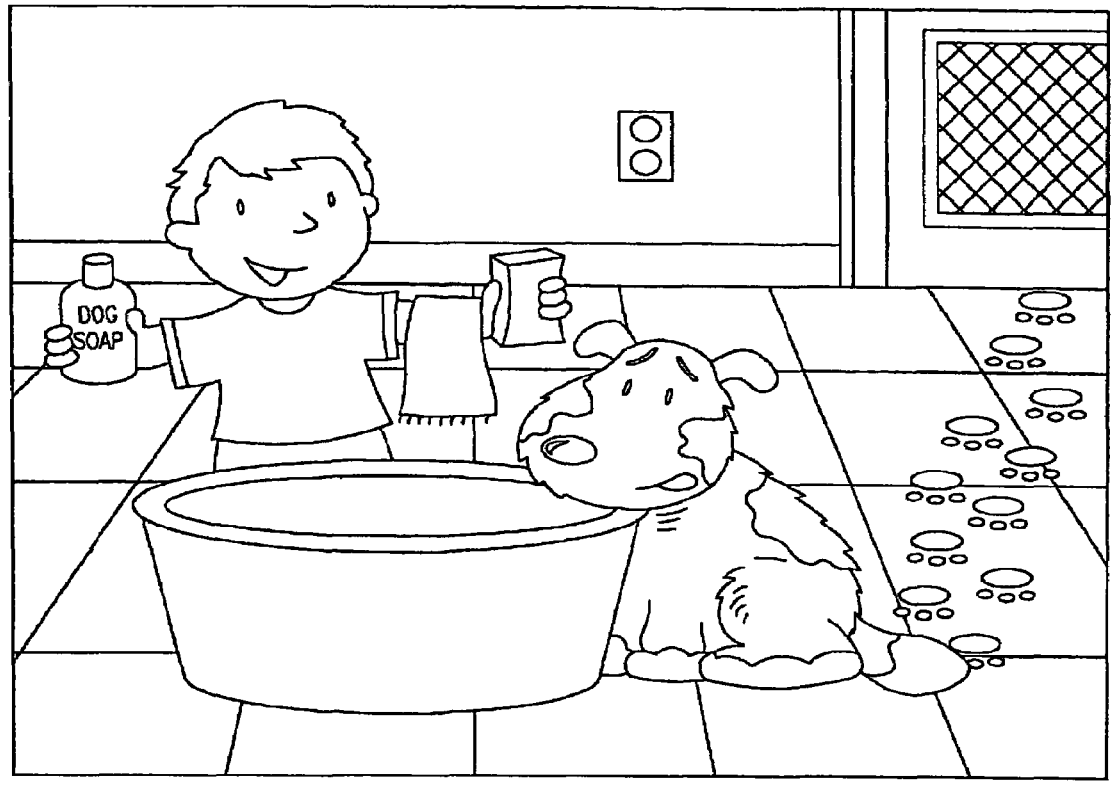
FIGS. 12–20 show selected pages of primers used in connection with the invention.
Figure 13:
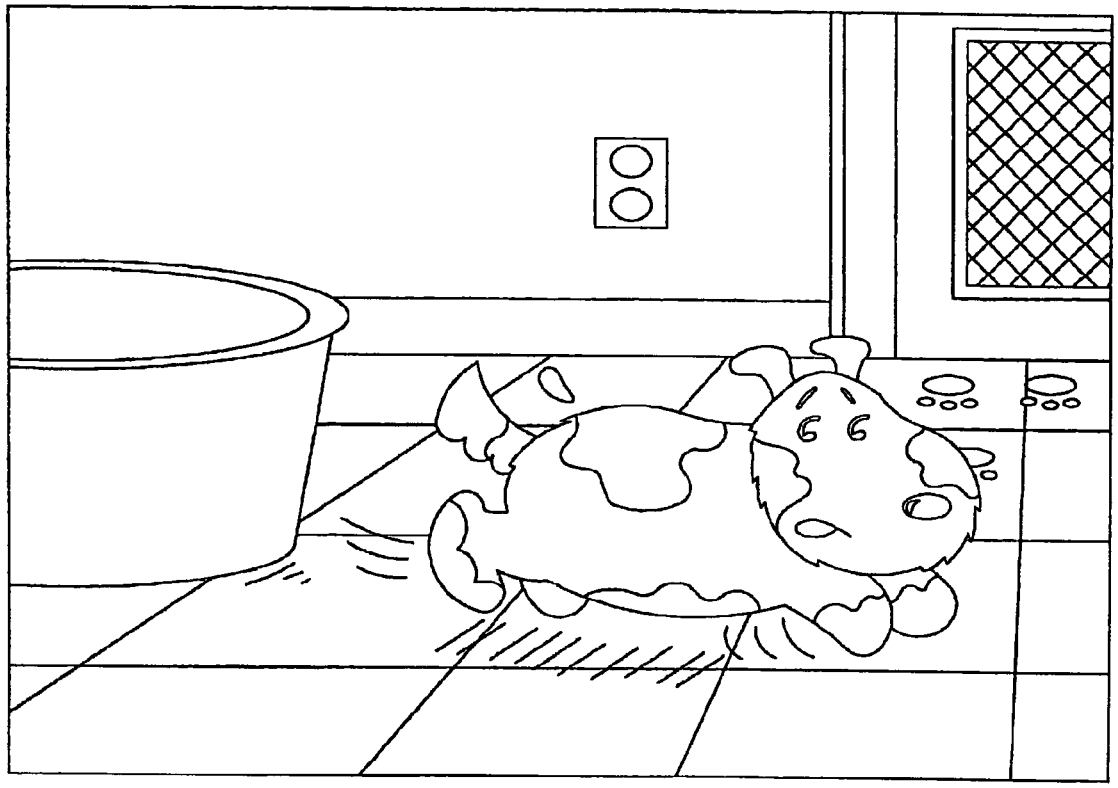

In one example, a primer focuses on the "short a" vowel sound. Such a primer features several words having the "short a" vowel in the context of a story. As seen in FIGS. 12–13, the primer provides a literary context for "short a" vowel words and coordinates the teaching and learning of, for example, the "short a" vowel words "Rags" and "sad" in the context of an engaging story and hands-on activities performed after reading the story. Providing a foundation for integrated hand-on learning activities involving the blocks is accomplished by coloring the letter "a" in the primer to match the color of the "a" blocks. In this example, the primer highlights the letter "a" in the corresponding color of the blocks, e.g., red. In addition, as shown in FIGS. 14–15, the primer provides a range of manipulative activities utilizing words featured in the primer to reinforce or extend the child's learning accomplished by reading the primer.

Figure 14:
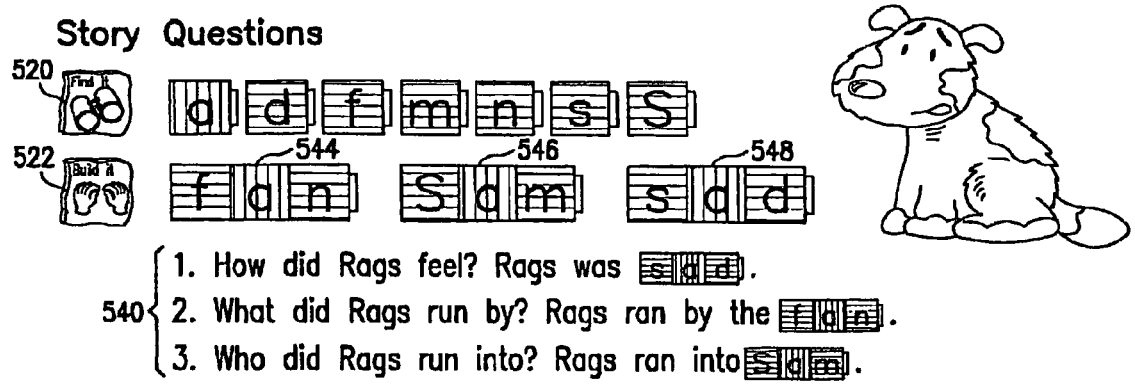

As seen in FIG. 14, once the story is read, the primer encourages the user with icon 520 to find blocks bearing selected reading indicia that can be used to spell the "short a" vowel words (intelligible reading units) used in the primer. Icon 522 then instructs the user to connect the blocks bearing the selected reading indicia so that the connected blocks form these words. Reading comprehension of the primer's story is then tested by questions 540 relating to the words formed by the connected blocks. Many other questions and hands-on activities with the blocks are also possible and included in the scope of the invention.

Figure 15:
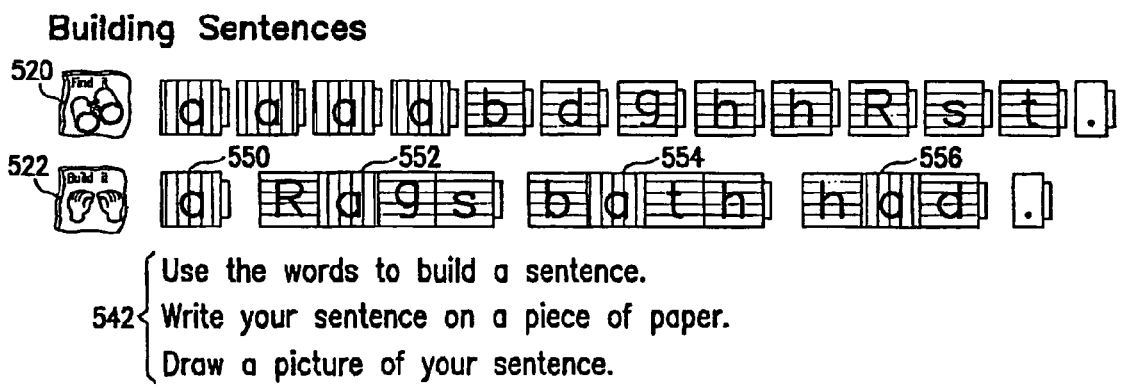

FIG. 15 illustrates how the primer can be used in connection with the blocks to teach a user to form sentences by properly assembling blocks bearing selected reading indicia, first into words and then into a sentence. First, icon 520 encourages the user to locate blocks bearing selected reading indicia. Icon 522 then instructs the user to connect the blocks to form words. The words 544, 546, 548, 550, 552, 554, 556 are found in the primer; thus, the hand-on activity directly reinforces the experience of reading the primer and mastering the lesson. The primer then provides instructions 542 which guide the user to further manipulate the assembled blocks to build a sentence, write the sentence, and draw a picture about the sentence. These additional activities reinforce the relationship of the primer's reading indicia and intelligible reading units to the blocks bearing the reading indicia and assembled into intelligible reading units. In addition, the activities reinforce the plot because they are directed to the actions in the story and reinforce the very experience of reading (decoding symbols representing language). Each primer is oriented to a particular reading skill so the activities are designed to strengthen the child's capabilities in developing that skill. The invention can be extended to teaching other languages or content areas using primers.

Other activities to use the primers and blocks together can be readily developed for the beginning reader. For instance, the "short a" sound can be further studied by asking the user to find blocks, assemble words used in the primer and determine the aural relationship among the words by saying the words. The user can tactilely practice spelling words used in the primer by assembling the blocks corresponding to the words to be spelled. These activities provide practice with word- and sentence-building, rhyming, spelling, and writing. As a result of using the color-coded, interlocking blocks to represent sounds, construct words, and create sentences, the user learns that there are predictable relationships between letters and spoken sounds.

Similar color-coded primers that are designed to work with the universally connectable blocks bearing reading indicia are used to develop and enhance other types of reading or phonics skills, including but not limited to the following: representing sounds, recognizing words, learning to spell words, spelling new words, creating sentences, and increasing reading comprehension.

Figure 17:
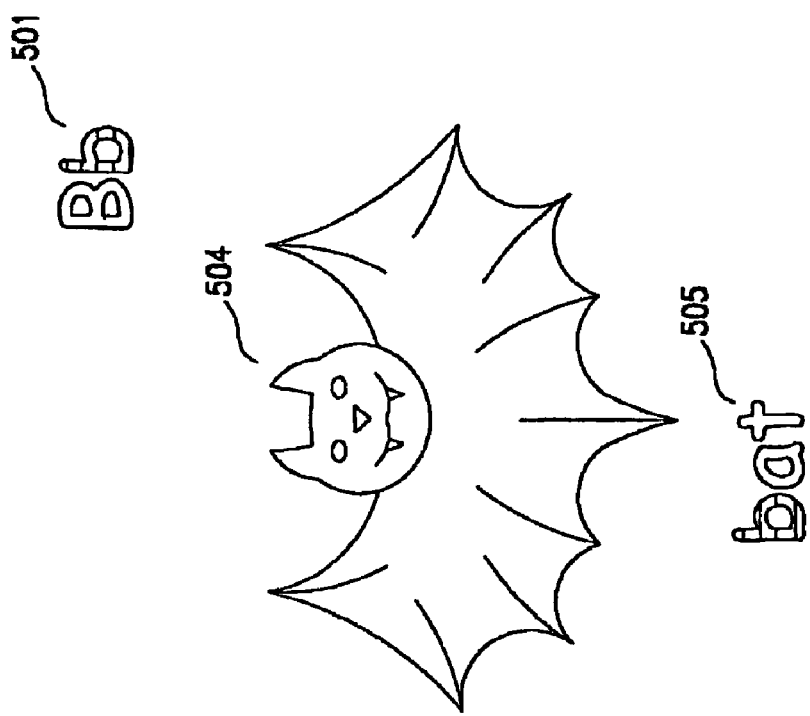
Figure 16:
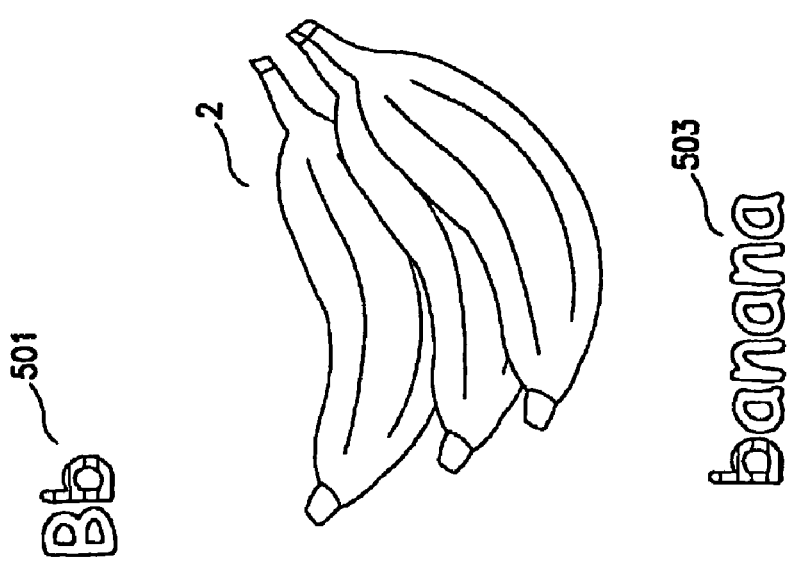
Figure 18:
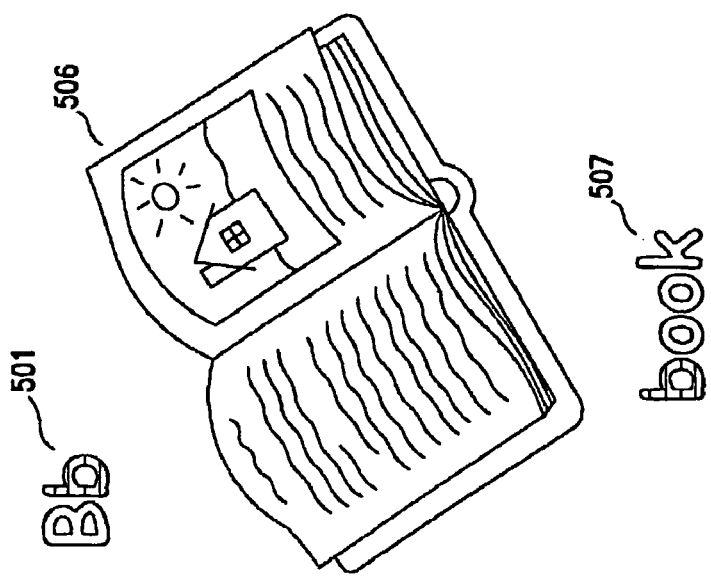

In another example, a primer used in connection with the alphabet and phonemic awareness kit for the beginning reader has pictures corresponding to the pictures shown on the picture blocks. Thus, for example, such a primer for the letter b has pictures of a ball, banana, bicycle, and book, along with the corresponding word. As seen in FIGS. 16–18, at least some of the pages of the primer include a letter component 501 (in this case "Bb"), picture components 502, 504, 506 (in this case, a banana 502 in FIG. 16, a bat 504 in FIG. 17, and a book 506 in FIG. 18), and word components 503, 505, 507 (in this case, "banana" 503 in FIG. 16, "bat" 505 in FIG. 17, and "book" 507 in FIG. 18).

The primer reinforces the relationship of the letters, pictures, and words in a literary context, i.e. by showing how they are used to tell a story. And, by highlighting the letter b throughout the text, both standing alone and within words, in the color corresponding to the color of the consonant blocks, e.g., blue, the primer also reinforces the relationship of the letters and words to the blocks. As seen in FIGS. 19–20, the primer has both tactile and visual activities to teach and learn reading.

Figure 19A:
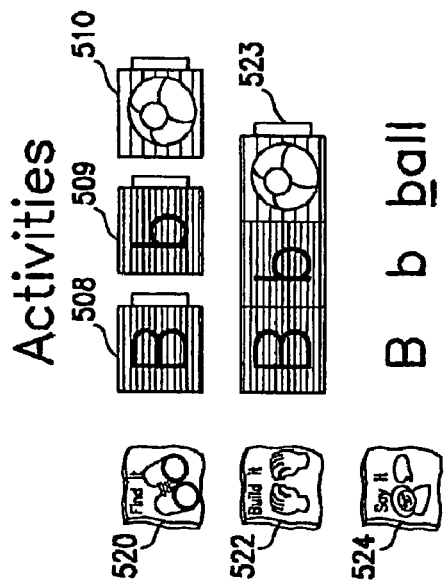

Thus, FIG. 19A shows a way to teach the concept of alphabet and phonemic awareness with respect to the consonant "b" with activities that link the blocks and primer. The first step is to read the primer. All the activities follow the reading exercise. Reading "ball" on that particular page is the primary objective of the primer. The later hands-on exercises are a means to an end of teaching reading. The primer, using a "find it" icon 520, encourages the user to find blocks as represented by block icons 508, 509, 510 that have identified reading indicia thereon, and that correspond to the reading indicia depicted in the primer (e.g., "B", "b", and a ball). The "build it" icon 522 then encourages the user to connect the actual blocks in the same order so that the connected blocks as represented by connected blocks icon 523 are horizontally adjacent and the selected indicia-bearing faces of each block are visible from the same direction. The user can then view the connected blocks and compare them to the illustrated connected blocks icon 523 to determine whether the indicia form the selected intelligible reading unit. Then, as indicated by the "say it" icon 524, the user views the selected intelligible reading unit as assembled on the connected blocks and reads it aloud to reinforce aurally what has been learned in both a visual and a manipulative context.

Figure 19B:
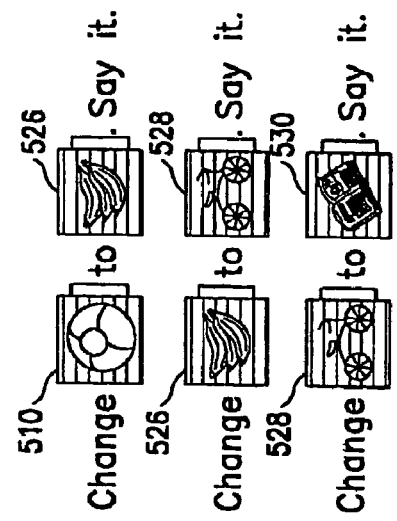

As seen in FIG. 19B, the primer guides the user to change or replace the block 510 bearing the "ball" reading indicium depicted in the connected blocks icon 523 with a block bearing a different reading indicium (e.g., the "banana" block as pictured by the banana picture block icon 526). Replacing "ball" with "banana" results in the assembly of a different intelligible reading unit (e.g., B b banana). Then, as indicated in the printed instruction "Say it.", the user views the newly assembled blocks bearing the different intelligible reading unit and reads it aloud to again reinforce aurally what has been learned in both a visual and a hands-on context. The primer guides the user to repeat the manipulative step of disconnecting and connecting blocks several times, which blocks reflect the different picture components that were used in the primer and that correspond to the different reading indicia used on the blocks. Thus, the user disconnects the block as represented by the block icon 510 from the other connected blocks represented by icons 508, 509, and either rotates the block represented by block icon 510 or selects a different block as represented by block icons 526, 528, 530, and then connects the selected block to the connected blocks so that the new combination of connected blocks form different intelligible reading units.

Figure 20A:
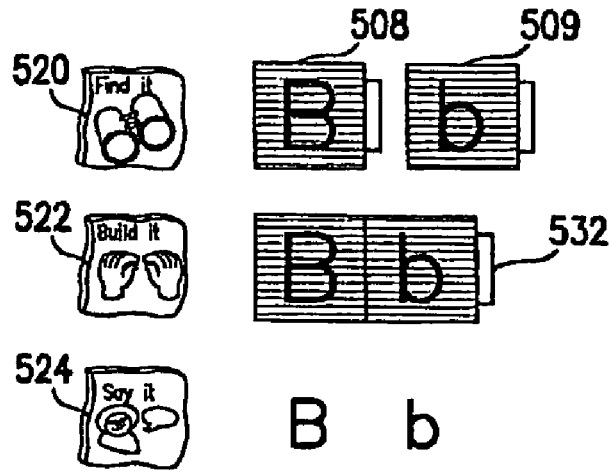
Figure 20B:
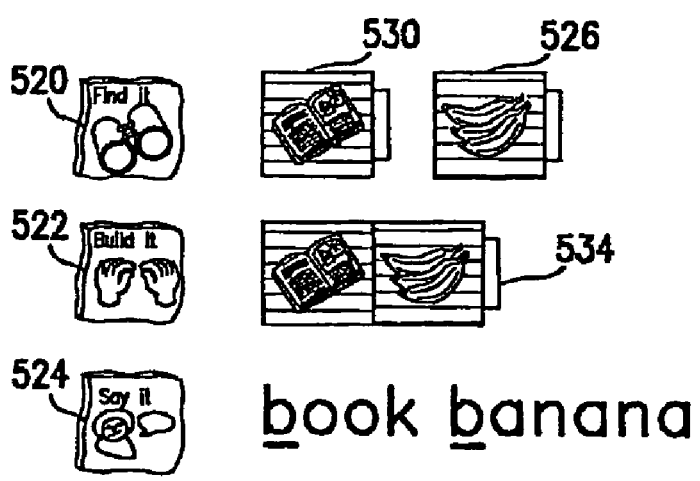

As seen in FIGS. 20A–20B, simpler intelligible reading units can also be assembled. Thus, as seen in FIG. 20A, the primer guides the user with icons 520, 522, 524 to assemble a two-block intelligible reading unit "Bb" as represented by icon 532 consisting of blocks represented by icons 508, 509. The primer shows this by connecting block icon 508 having the "B" reading indicium and block icon 509 having the "b" reading indicium. Similarly, in FIG. 20B, a two-block intelligible reading unit is represented by icon 534 which shows blocks depicting the pictures "book" and "banana", consisting of block icons 530, 526, with the "book" picture and "banana" reading indicia, respectively.

Other methods of using the primers and blocks enhance the user's reading skills and test the user's reading comprehension. For instance, the user could be asked to identify other pictures in the primer that start with the same letter by placing a block having the correct letter (or other reading indicium) on the picture. Or the user can find blocks having the reading indicia that would permit assembly of an entire word and icon, creating the primer's text in blocks. Other similar activities are also readily developed.

These exercises in which the reader locates b picture blocks and Bb consonant blocks provide the user with opportunities to manipulate the blocks to discover and reinforce (or possibly extend) the concepts taught by the primer, including the concept that words that start with the same sound often start with the same letter.

The inventive method provides opportunities for an instructor to perform reading assessment and diagnostics. A correct block assembly, i.e., a block assembly that arranges the blocks in the manner directed by the primer, visibly demonstrates that the student understands the primer and the reading skill taught by that primer. An incorrect block assembly demonstrates a possible lack of complete understanding and suggests the need for further lessons. Advantageously, the assessment and diagnostics can be accomplished by someone without teaching skills, such as a teacher's aide or parent, as well as by a teacher. The instructor can conveniently assess mastery of a specific primer by several students simultaneously. The activities allow the instructor to visually detect if the students comprehend the lesson. For instance, a student may have memorized that the "book" icon starts with a "b" sound, but fail to understand that "ball" also starts with the "b" sound. The activities will expose such specific gaps in a student's comprehension. The simple, easy-to-understand nature of the hands-on activities allows the instructor to delegate the lesson to others, either in the classroom or in "take home" exercises. The simplicity of the method greatly aids the instructor by allowing flexibility in delivering the lesson. Indeed, by delaying or repeating the hands-on activities, the inventive method allows repeated reinforcement of the lessons learned in reading the primer and the assessment of retention of skills long after completion of the reading exercise.

It should be recognized that, while the invention has been described in relation to a preferred embodiment, those skilled in the art may develop a wide variation of structural details without departing from the principles of the invention. Accordingly, the appended claims are to be construed to cover all equivalents falling within the scope and spirit of the invention.

The invention claimed is:

1. A method of teaching and learning reading using a group of universally connectable blocks, wherein the group includes at least two blocks of different colors, wherein each of said blocks comprises at least three faces, all of said faces of each block bearing a type of reading indicia, the color of the faces and the type of reading indicia being the same on all of said faces of any one block, and wherein all blocks of the same color have the same type of reading indicia and each type of reading indicia is assigned to a unique color, the method comprising:
   (a) selecting a first and a second block from said group of universally connectable blocks, said selecting based solely on the reading indicia or the color of the blocks;
   (b) selecting any indicium-bearing face of said first block and any indicium-bearing face of said second block;
   (c) connecting said first block and said second block so that the connected blocks are horizontally adjacent and the selected indicia-bearing faces of each block are visible from the same direction; and
   (d) viewing the color or selected indicia of said connected blocks to determine whether said indicia appear together to form an intelligible reading unit.

2. The method of claim 1 wherein each indicia-bearing face is perpendicular to another indicia-bearing face.

3. The method of claim 1 wherein the type of reading indicia is selected from the group consisting of: vowels, consonants, pictures, initial consonants, rimes, "magic" es, consonant combinations, vowel combinations, affixes, root words, nouns, noun endings, pronouns, verbs, verb endings, adjectives, adjective endings, adverbs, prepositions, conjunctions, interjections, and punctuation marks.

4. The method of claim 3 wherein the consonant combinations are selected from the group consisting of: initial blends, final blends, consonant digraphs, and word endings.

5. The method of claim 3 wherein the vowel combinations are selected from the group consisting of vowel digraphs, diphthongs, and r-controlled vowels.

6. The method of claim 3 wherein the consonants are selected from the group consisting of the uppercase and lowercase consonants.

7. The method of claim 3 wherein the affixes are selected from the group consisting of prefixes and suffixes.

8. The method of claim 3 wherein the root words are selected from the group consisting of Greek roots, Latin roots, and English base words.

9. The method of claim 1 wherein the indicia-bearing faces are co-planar when the selected blocks are connected.

10. The method of claim 1 wherein the selected blocks are connected frictionally.

11. The method of claim 1 further comprising rotating at least one of the first and second blocks to align any other indicium-bearing face of one of the two blocks with any indicium-bearing face of the other of said two blocks.

12. The method of claim 1 wherein each of said blocks has a female end and a male end, and wherein said male end of one block is connectable only to a female end of another block, such that said connecting step involves connecting either a male or female end of said first block with the female or male end, respectively, of said second block.

13. The method of claim 1 further comprising using a flipbook to teach and learn reading, the flipbook including instructions for (1) selecting blocks and (2) directing the connection of the selected blocks so that the blocks form an intelligible reading unit.

14. The method of claim 1 wherein the reading is aloud.

15. The method of claim 1 wherein the reading is silent.

16. A method of teaching and learning reading using a group of universally connectable blocks, wherein the group includes at least two blocks bearing different reading indicia, wherein each of said blocks comprises at least three faces, all of said faces of each block bearing a type of reading indicia, the color and the type of reading indicia being the same on all of said faces of any one block, wherein all blocks of the same color have the same type of reading indicia and each type of reading indicia assigned to a unique color, the method comprising:
(a) choosing an intelligible reading unit to be assembled from two or more of said group of universally connectable blocks;
(b) selecting first and second blocks from said group of blocks, said selecting based solely on the reading indicia or the color of the blocks;
(c) selecting an indicium-bearing face of said first block and an indicium-bearing face of said second block;
(d) connecting said first selected block and said second selected block so that the selected indicia-bearing faces of each block are visible from the same direction;
(e) viewing said connected blocks to determine from said indicia or color of said connected blocks whether the chosen intelligible reading unit has been assembled on said selected indicia-bearing faces and if the chosen intelligible reading unit has been assembled, stopping the method;
(f) if said connected blocks do not form the chosen intelligible reading unit, then
(1) disconnecting one or more of said blocks and rotating at least one of said disconnected blocks so that at least one of the three selected indicia-bearing faces is different from the previously selected faces and reconnecting said blocks so that the selected indicia-bearing faces of each block are visible from the same direction; or
(2) disconnecting one or more of said blocks and connecting said disconnected blocks in a different order so that the selected indicia-bearing faces of each block are visible from the same direction; or
(3) selecting at least one additional block from the group of universally connectable blocks and connecting said additional block to one or more of said previously connected blocks so that the selected indicia-bearing faces of each block are visible from the same direction; or
(4) repeating steps (b) through (e) with previously unselected first and second blocks; and
(g) repeating step (f) until the chosen intelligible reading unit has been assembled on said selected indicia-bearing faces.

17. The method of claim 16 wherein said connected blocks are horizontally adjacent.

18. A method of teaching and learning reading using a group of universally connectable blocks and a primer having intelligible reading units composed of reading indicia, wherein the group includes at least two blocks of different colors, wherein each of said blocks comprises at least three faces, all of said faces bearing a type of reading indicia, the color of the faces and the type of reading indicia being the same on all of said faces of any one block, wherein all blocks of the same color have the same type of reading indicia and each type of reading indicia is assigned to a unique color, and wherein at least one of the reading indicia in the primer is colored to correspond to the color of the blocks bearing the same type of reading indicia, the method comprising:
(a) reading the primer;
(b) reading selected reading indicia in the primer;
(c) locating blocks having the selected reading indicia;
(d) reading an intelligible reading unit comprised of the selected reading indicia in the primer;
(e) assembling the selected reading indicia to form the intelligible reading unit by:
(i) selecting a first and a second block from said group of universally connectable blocks having the identified reading indicia;
(ii) connecting said first block and said second block so that the connected blocks are horizontally adjacent and the selected indicia-bearing faces of each block are visible from the same direction; and
(iii) viewing the color or selected indicia of said connected blocks to determine whether said indicia appear together to form the selected intelligible reading unit.

19. The method of claim 18 wherein the reading is aloud.

20. The method of claim 18 wherein the reading is silent.

21. The method of claim 18 wherein the selected intelligible reading unit is used to answer questions in the primer.

22. The method of claim 18 wherein the selected intelligible reading unit is used to complete sentences in the primer.

23. The method of claim 18 wherein step (a) comprises reading a story.

24. A method of teaching and learning reading using a group of universally connectable blocks and a primer, wherein the group includes at least two blocks of different colors, wherein each of said blocks comprises at least three faces, all of said faces of each block bearing a type of reading indicia, the of the faces color and the type of reading indicia being the same on all of said faces of any one block, wherein all blocks of the same color have the same type of reading indicia and each type of reading indicia is assigned a unique color, and wherein the primer has intelligible reading units comprised of reading indicia, and at least one of the reading indicia is colored to correspond to the color of the blocks bearing the same type of reading indicia, the method comprising:

(a) reading the primer;
(b) reading selected reading indicia in the primer;
(c) locating a group of blocks having the selected reading indicia;
(d) reading an intelligible reading unit comprised of two or more of the selected reading indicia in the primer;
(e) assembling the selected reading indicia to form the intelligible reading unit by:
  (i) selecting first and second blocks from said group of blocks, said selecting based solely on the reading indicia of the blocks;
  (ii) selecting an indicium-bearing face of said first block and an indicium-bearing face of said second block;
  (iii) connecting said first selected block and said second selected block so that the selected indicia-bearing faces of each block are visible from the same direction;
  (iv) viewing said connected blocks to determine from said indicia or color of said connected blocks whether the chosen intelligible reading unit has been assembled on said selected indicia-bearing faces and if the chosen intelligible reading unit has been assembled, stopping the method;
(f) if said connected blocks do not form the chosen intelligible reading unit, then
  (1) disconnecting one or more of said blocks and rotating at least one of said disconnected blocks so that at least one of the three selected indicia-bearing faces is different from the previously selected faces and reconnecting said blocks so that the selected indicia-bearing faces of each block are visible from the same direction; or
  (2) disconnecting one or more of said blocks and connecting said disconnected blocks in a different order so that the selected indicia-bearing faces of each block are visible from the same direction; or
  (3) selecting at least one additional block from the group of universally connectable blocks and connecting said additional block to one or more of said previously connected blocks so that the selected indicia-bearing faces of each block are visible from the same direction; or
  (4) repeating steps (b) through (e) with previously unselected first and second blocks; and
(g) repeating step (f) until the chosen intelligible reading unit has been assembled on said selected indicia-bearing faces.

* * * * *